(12) United States Patent
Hasegawa

(10) Patent No.: US 8,012,612 B2
(45) Date of Patent: Sep. 6, 2011

(54) INTERLAYER FOR LAMINATED GLASS AND LAMINATED GLASS

(75) Inventor: Tsuyoshi Hasegawa, Koka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 11/597,894

(22) PCT Filed: Jan. 31, 2006

(86) PCT No.: PCT/JP2006/301510
§ 371 (c)(1),
(2), (4) Date: Dec. 27, 2006

(87) PCT Pub. No.: WO2006/082800
PCT Pub. Date: Aug. 10, 2006

(65) Prior Publication Data
US 2007/0231584 A1    Oct. 4, 2007

(30) Foreign Application Priority Data

| Feb. 3, 2005 | (JP) | 2005-028154 |
| May 30, 2005 | (JP) | 2005-158081 |
| Jun. 2, 2005 | (JP) | 2005-162909 |
| Jun. 2, 2005 | (JP) | 2005-162910 |
| Sep. 26, 2005 | (JP) | 2005-278953 |
| Sep. 26, 2005 | (JP) | 2005-278955 |
| Sep. 26, 2005 | (JP) | 2005-278956 |
| Sep. 26, 2005 | (JP) | 2005-278957 |

(51) Int. Cl.
*B32B 27/14* (2006.01)
(52) U.S. Cl. ........ 428/702; 428/432
(58) Field of Classification Search .......... 428/216, 428/220, 328, 329, 688, 327, 426, 432, 437, 428/689, 702
See application file for complete search history.

(56) References Cited

U.S. PATENT DOCUMENTS

| 4,193,474 A | 3/1980 | Okubo et al. |
| 5,340,654 A | 8/1994 | Ueda et al. |
| 5,368,917 A | 11/1994 | Rehfeld et al. |
| 5,830,568 A | 11/1998 | Kondo |
| 2002/0150764 A1* | 10/2002 | Shichiri et al. ........ 428/436 |
| 2004/0157048 A1* | 8/2004 | Nagai ........ 428/215 |

FOREIGN PATENT DOCUMENTS

| DE | 197 56 274 | 6/1999 |
| JP | 2-56295 | 11/1990 |
| JP | 6-263489 | 9/1994 |
| JP | 8-259279 | 10/1996 |
| JP | 2703471 | 10/1997 |
| JP | 2000-016841 | 1/2000 |
| JP | 2000-072496 | * 3/2000 |
| JP | 2001-58853 | 3/2001 |
| JP | 2003-55006 | 2/2003 |
| JP | 2003-252655 | 9/2003 |
| JP | 2003-252657 | 9/2003 |
| WO | 03/093000 | 11/2003 |

OTHER PUBLICATIONS

Yoshio translation, obtained Aug. 13, 2008.*
Glass on web (http://www.glassonweb.com/articles/article/188/), obtained Aug. 13, 2008.*
Supplementary European Search Report issued Feb. 2, 2011 in corresponding European patent application No. 06 71 2653, in the English language.
Official Action issued Jan. 15, 2010 in corresponding Russian Application No. 2007132855/03(035861) with English translation.
Australian Office Action (in the English language) issued Jun. 15, 2010 in corresponding Australian Application No. 2006211298.

* cited by examiner

*Primary Examiner* — Timothy M Speer
*Assistant Examiner* — Lauren Robinson
(74) *Attorney, Agent, or Firm* — Wenderoth, Lind & Ponack, L.L.P.

(57) ABSTRACT

The present invention provides an interlayer for laminated glass which comprises at least one layer composed of an opaque ethylene-vinyl acetate copolymer resin composition or opaque polyvinyl acetal resin composition, and also provides the laminated glass using such interlayers. The interlayer for laminated glass and the laminated glass according to the present invention can offer excellent privacy protection.

5 Claims, No Drawings

INTERLAYER FOR LAMINATED GLASS AND LAMINATED GLASS

TECHNICAL FIELD

The present invention relates to an interlayer for laminated glass and also to laminated glass, both of which allow light to pass but cannot permit the persons or objects existing behind them to be visually identified.

BACKGROUND ART

There have heretofore been known opaque laminated glass, which is produced by bonding at least two transparent glass sheets with an interlayer having such an opacifier as calcium carbonate or silica dispersed in a thermoplastic resin. Such opaque laminated glass can transmit light, but cannot permit the persons or objects existing behind them to be visually identified. Therefore, the opaque laminated glass has been used in the locations where privacy protection is required to be secured, such as lighting windows, bathroom doors and panels or wainscots for balconies (for example, refer to Japanese Patent Publication (examined) No. 2-56295).

However, such conventional opaque laminated glass using an opacifier causes the problem that uneven coloring is likely to occur due to agglomeration or poor dispersion of particles of the opacifier. In addition, there is also created the problem that the particles of the opacifier, which are present at an interface between each glass sheet and the interlayer, impair adhesion at the interface so that fine air bubbles are likely to be formed.

In order to solve such problems, there has been proposed an interlayer for opaque laminated glass consisting of (a) a polyvinyl acetal resin produced by acetalization of a polyvinyl alcohol having a degree of saponification of not less than 96 mol % with an aldehyde having 1 to 10 carbon atoms, (b) a polyvinyl acetal resin produced by acetalization of a polyvinyl alcohol having a degree of saponification of less than 96 mol % with an aldehyde having 1 to 10 carbon atoms and (c) a plasticizer (Japanese Patent Laid-open No. 6-263489).

However, opaque laminated glass described in Japanese Patent Laid-Open No.6-263489 does not yet have a lowered visible-light transmittance suited for privacy protection, and also undergoes decreases in its transmittances for other rays or light, or impairs the proper, fundamental characteristics required of laminated glass, when an attempt is made to get its visible light transmittance decreased to a lowered level suited for privacy protection, thus being not necessarily satisfactory.

Also, the laminated glass, as produced by bonding, for example, an interlayer composed of a polyvinyl butyral rein plasticized with a plasticizer, etc. between at least two transparent glass sheets has been widely used as windowpanes in automobiles and buildings, etc. Furthermore, such laminated glass offers the advantage that utilization of interlayers colored with a variety of coloring agents can facilitate the resultant tinted laminated glass to control or regulate the inner quantity of light.

Laminated glass using this type of interlayers has the fundamental characteristics required of the laminated glass, such as good weatherability, satisfactory adhesion between the interlayer and glass sheet, reasonable resistance to penetration or piercement by objects when subjected to external impacts, and adequate resistance to shattering or shatter-proofness when broken by external impacts, although the laminated glass encounters the problem of inferior sound-insulating property.

Particularly, such laminated glass shows a reduced sound transmission loss owing to the coincidence effect in the range of middle to high frequencies of about 2,000 to 5,000 Hz, and suffers from deterioration in sound-insulating property, wherein the term "coincidence effect" is understood to refer to the phenomenon in which when a sound wave enters a glass sheet, a transverse wave is propagated on the surface of the glass sheet due to the rigidity and inertia of the glass sheet and becomes resonant with the incident sound wave, thereby causing sound transmission. The coincidence effect is shifted to a higher frequency region according as the surface density of the laminated glass is smaller, that is, the thickness of the glass sheet diminishes.

In accordance with an increasingly growing demand for improved sound-insulating property, in recent years, there is required the laminated glass which can exhibit excellent sound-insulating property in addition to the fundamental characteristics as described above. Referring to an interlayer for improved sound-insulating laminated glass and such sound-insulating laminated glass, for example, Japanese Patent No. 2703471 discloses laminated glass using an interlayer for sound-insulating laminated glass of which interlayer comprises not less than at least two different plasticized polyvinyl acetal resin films being laminated.

In order to enhance the sound-insulating property of laminated glass, however, there has been strongly demanded an interlayer for laminated glass which can attain the enhanced sound-insulating property as compared with the conventional ones.

In addition, the conventional sound-insulating polyvinylacetal resin interlayers, with their increased contents of plasticizers, have caused the problem that blocking is likely to occur during storage or handling, and such sound-insulating polyvinyl acetal resin film has therefore been laminated on both sides with the polyvinyl acetal resin films with a reduced content of a plasticizer to form the three-layered film, thereby preventing the interlayer from causing blocking.

The laminated glass using the conventional sound-insulating interlayers, although it has successfully prevented deterioration in the sound-insulating property as caused by the above-described coincidence effect and has exhibited excellent sound-insulating property, has confronted the problem that its sound-insulating property gets impaired in cases where it is exposed to temperature rises caused by irradiation with sunlight, etc.

SUMMARY OF THE INVENTION

Problems to be Solved by the Invention

With a specific view to solving the above-described problems, the present invention has been completed, and an object of the present invention is to provide the interlayer for laminated glass and the laminated glass, both of which can offer excellent performance in privacy protection.

The preferred first invention of the present invention has also been completed in consideration of the above-described problems, and has as its object to provide the interlayer for laminated glass, and the laminated glass, both of which can exhibit excellent privacy protection.

The preferred second invention of the present invention has also been accomplished in light of the above-described problems, and has as its object to provide an interlayer for laminated glass, and laminated glass, which exhibit improved privacy protection and sound-insulating property, is reduced in self-adhesiveness and less likely to cause blocking, and can shield the sunlight.

The preferred third invention of the present invention has also been completed in consideration of the above-described problems, and has as its object to provide an interlayer for laminated glass and laminated glass, which exhibits excellent privacy protection and sound-insulating property, and also shield the sunlight.

The preferred fourth invention of the present invention has been made too in view of the above-described problems, and has as its object to provide an interlayer for laminated glass and laminated glass, which can prevent deterioration in the sound-insulating property associated with the temperature rises caused by irradiation with the sunlight, and also exhibit excellent performance in privacy protection and light shielding property.

The Means to Solve the Problems

The present inventors conducted extensive research to achieve the above objects, and as a result found that an interlayer for laminated glass, which comprises at least one layer composed of an opaque ethylene-vinyl acetate copolymer resin composition or opaque polyvinyl acetal resin composition, can offer excellent privacy protection, thus leading to completion of the present invention. This was followed by further extensive investigation, resulting in completion of the below-described first, second, third, and fourth inventions of the present invention.

(The Means to Solve the Problems of the First Invention)

The present inventors conducted extensive investigation to achieve the above-described objects, and as a result found that use of an interlayer for laminated glass composed of an opaque ethylene-vinyl acetate copolymer (EVA) resin composition containing fine-particle inorganic powder and heat-ray shielding fine particles makes it possible to produce a laminated glass which shows a lowered visible light transmittance suited for privacy protection and also dose not create the problems of occurrence of uneven coloring due to agglomeration or poor dispersion of fine-particle inorganic powder (especially, an opacifier) and formation of fine air bubbles due to deterioration of adhesion at the interface between a glass sheet and an interlayer brought about by fine-particle inorganic powder (especially an opacifier) present at the interface, thereby permitting the problems of the prior art to be solved at once, and these findings were followed by further extensive investigation, leading to completion of the first invention of the present invention.

Namely, the first invention of the present invention relates to:

(1-1) An interlayer for laminated glass, characterized in that said interlayer is composed of an opaque ethylene-vinyl acetate copolymer resin composition containing fine-particle inorganic powder and heat-ray shielding fine particles, (1-2) The interlayer for laminated glass according to the above (1-1), wherein the fine-particle inorganic powder is calcium carbonate or silica, (1-3) The interlayer for laminated glass according to the above (1-1) or (1-2), wherein the heat-ray shielding fine particles are tin-doped indium oxide, and (1-4) Laminated glass, characterized in that said laminated glass comprises the interlayer for laminated glass according to any one of the above (1-1) to (1-3) being bonded between at least two glass sheets.

(The Means to Solve the Problems of the Second Invention)

The above-described object of the second invention can be accomplished by the inventions to be described below under (2-1) to (2-3).

(2-1) An interlayer for laminated glass, characterized in that said interlayer is composed of an opaque and sound-insulating polyvinyl acetal resin composition containing fine-particle inorganic powder, (2-2) An interlayer for laminated glass, characterized in that the opaque and sound-insulating polyvinyl acetal resin composition further contains heat-ray shielding fine particles, and (2-3) Laminated glass, characterized in that said laminated glass comprises at least two transparent glass sheets, wherein the interlayer for laminated glass according to the above (2-1) or (2-2) is bonded between them.

(The Means to Solve the Problem of the Third Invention)

The above-described object of the third invention can be accomplished by the inventions to be described below under (3-1) to (3-3).

(3-1) An interlayer for laminated glass, characterized in that said interlayer comprises at least two layers of (A) an opaque and sound-insulating polyvinyl acetal resin layer containing fine-particle inorganic powder and (B) a transparent polyvinyl acetal resin layer being laminated together, (3-2) The interlayer for laminated glass according to the above (3-1), characterized in that at least either one of (A) the opaque and sound-insulating polyvinyl acetal resin layer and (B) the transparent polyvinyl acetal resin layer contains heat-ray shielding fine particles, and (3-3) Laminated glass, characterized in that said laminated glass comprises at least two transparent glass sheets, wherein the interlayer for laminated glass according to the above (3-1) or (3-2) is bonded between them.

(The Means to Solve the Problems of the Fourth Invention)

The object of the fourth invention can be accomplished by the inventions to be described below under the items (4-1) to (4-8).

(4-1) An interlayer for laminated glass, characterized in that said interlayer comprises a sound-insulating polyvinyl acetal resin layer being laminated to an opaque polyvinyl acetal resin layer.

(4-2) The interlayer for laminated glass according to the above (4-1), characterized in that the opaque polyvinyl acetal resin layer consists of a tinted layer being colored with inorganic fine particles, (4-3) The interlayer for laminated glass according to the above (4-1) or (4-2), characterized in that the opaque polyvinyl acetal resin layer consists of a tinted layer being colored with achromatic inorganic fine particles.

(4-4) The interlayer for laminated glass according to any one of the above (4-1) to (4-3), characterized in that the sound-insulating polyvinyl acetal resin layer is chromatically or achromatically colored and is transparent or opaque.

(4-5) The interlayer for laminated glass according to any one of the above (4-1) to (4-4), characterized in that at least either one of the sound-insulating polyvinyl acetal resin layer and the opaque polyvinyl acetal resin layer contains heat-ray shielding fine particles.

(4-6) The interlayer for laminated glass according to any one of the above (4-1) to (4-5), characterized in that the sound-insulating polyvinyl acetal resin layer and the opaque polyvinyl acetal resin layer are laminated together through a transparent polyvinyl acetal layer interposed.

(4-7) Laminated glass, characterized in that said laminated glass comprises at least two transparent glass sheets, wherein the interlayer for laminated glass according to any one of the above (4-1) to (4-6) being bonded between them.

(4-8) The laminated glass according to the above (4-7), characterized in that said laminated glass has a haze value of not less than 20%.

Namely, the present invention relates to:

(1) An interlayer for laminated glass, which comprises at least one layer composed of an opaque ethylene-vinyl acetate copolymer resin composition or an opaque polyvinyl acetal resin composition, (2) An interlayer for laminated glass, which is composed of an opaque ethylene-vinyl acetate copolymer resin composition containing fine-particle inorganic powder and heat-ray shielding fine particles, (3) The interlayer for laminated glass according to the above (2), wherein the fine-particle inorganic powder is calcium carbonate or silica, (4) The interlayer for laminated glass according to the above (2) or (3), wherein the heat-ray shielding fine particles are tin-doped indium oxide, (5) An interlayer for laminated glass, characterized in that said interlayer is composed of an opaque and sound-insulating polyvinyl acetal resin composition containing fine-particle inorganic powder, (6) The interlayer for laminated glass according to the above (5), characterized in that the opaque and sound- insulating polyvinyl acetal resin composition further contains heat-ray shielding fine particles, (7) An interlayer for laminated glass, characterized in that said interlayer comprises at least two kinds of layers of (A) an opaque and sound-insulating polyvinyl acetal resin layer containing fine-particle inorganic powder and (B) a transparent polyvinyl acetal resin layer being laminated together, (8) The interlayer for laminated glass according to the above (7), characterized in that at least either one of (A) an opaque and sound-insulating polyvinyl acetal resin layer and (B) a transparent polyvinyl acetal resin layer contains heat-ray shielding fine particles, (9) An interlayer for laminated glass, characterized in that said interlayer comprises a sound-insulating polyvinyl acetal resin layer and an opaque polyvinyl acetal resin layer being laminated together,

(10) The interlayer for laminated glass according to the above (9), wherein the opaque polyvinyl acetal resin layer is a tinted layer colored with inorganic fine particles,

(11) The interlayer for laminated glass according to the above (9) or (10), wherein the opaque polyvinyl acetal resin layer is a tinted layer colored with achromatic inorganic fine particles,

(12) The interlayer for laminated glass according to any one of the above (9) to (11), characterized in that the sound-insulating polyvinyl acetal resin layer is chromatically or achromatically colored and is transparent or opaque,

(13) The interlayer for laminated glass according to any one of the above (9) to (12), characterized in that at least either one of the sound-insulating polyvinyl acetal resin layer and opaque polyvinyl acetal resin layer contains heat-ray shielding fine particles,

(14) The interlayer for laminated glass according to any one of the above (9) to (13), wherein the interlayer comprises the sound-insulating polyvinyl acetal resin layer and the opaque polyvinyl acetal resin layer being laminated together through a transparent polyvinyl acetal layer interposed;

(15) A laminated glass, characterized in that the interlayer for laminated glass according to any one of the above (1) to (14) is bonded between at least two glass sheets, and

(16) The laminated glass according to the above (15), characterized in that the laminated glass has a haze value of not less than 20%.

EFFECTS OF THE INVENTION

The interlayer for laminated glass and the laminated glass comprising said interlayer can exhibit excellent performance in privacy protection.

(Effect of the First Invention)

Laminated glass which comprises the interlayer for laminated glass according to the first invention can exhibit excellent performance in privacy protection, while it particularly exhibits a low visible light transmittance suited for privacy protection, namely a visible-light transmittance as low as not more than 2.5%, and also shows excellent heat-shielding property.

The laminated glass according to the first invention not only exhibits a low visible light transmittance suited for privacy protection, but also eliminates the problem of occurrence of uneven coloring caused by agglomeration or poor dispersion of fine-particle inorganic powder (especially the opacifier), while at the same time, it can produce the effect of preventing the problem of formation of fine air bubbles caused by a decrease in interfacial adhesion brought about by the fine-particle inorganic powder being present at the interface between the glass sheet and interlayer.

On account of these, the laminated glass according to the first invention is suitably usable in the application fields where the privacy protection is particularly required to be ensured, among the roof and side-window panes of automobiles or panes for buildings, etc.

(Effect of the Second Invention)

The interlayer for laminated glass according to the second invention is composed of an opaque and sound-insulating polyvinyl acetal resin composition, and, with the fine-particle inorganic powder formulated therein, can achieve the enhanced sound-insulating property. Because the sound-insulating polyvinyl acetal resin composition is opaque, furthermore, the interlayer can yield the laminated glass with additionally excellent light-shielding property.

Moreover, the resin composition contains fine-particle inorganic powder formulated therein, resulting in production of the interlayer for laminated glass with decreased self-adhesiveness in spite of its greater content of plasticizer.

The interlayer for laminated glass according to the second invention, when colored with achromatic inorganic powder, can produce the effect of development of much more subdued color tone.

Because the laminated glass according to the second invention is composed of the opaque and sound-insulating polyvinyl acetal resin composition having fine-particle inorganic powder formulated therein, the laminated glass produced with use of said interlayer is suitably usable in the application fields where the light-shielding property is particularly required, among the roof and side-window panes of automobiles except windshields, or panes for buildings, and the like. In particular, the laminated glass produced by use of the white-colored interlayer for laminated glass allows the visible light to transmit but cannot permit the persons or objects existing behind it to be visually identified, and consequently is suitably utilizable in the locations where privacy protection is particularly required to be ensured, such as lighting windows, bathroom doors, and panels or wainscots for balconies.

(Effect of the Third Invention)

The interlayer for laminated glass according to the third invention comprises an opaque polyvinylacetal resin layer (A) and a transparent polyvinyl acetal resin layer (B) being laminated together, and can produce enhanced sound-insulating effect owing to the fine-particle inorganic powder formulated therein.

The difference in viscoelastic property between the sound-insulating polyvinyl acetal rein layer (A) and the transparent polyvinyl acetal resin layer (B) can permit sound energy to be effectively converted and absorbed into heat energy on account of the internal friction effect between the two resin layers, and the sound-insulating property can be prevented from deterioration caused by the coincidence effect at the middle to high frequencies of about 2,000 to 5,000 Hz.

The interlayer, in which the sound-insulating polyvinyl acetal resin layer is opaque, can provide the laminated glass with excellent light-shielding property.

The interlayer for laminated glass according to the third invention, when colored with achromatic inorganic fine particles, can produce the effect of development of much more subdued color tone.

Since the interlayer for laminated glass is composed of the sound-insulating polyvinyl acetal resin layer containing fine-particle inorganic powder, the laminated glass produced with use of said interlayer is suitably usable in the application fields where the light-shielding property is particularly required, among the roof and side-window panes of automobiles except windshields, or panes for buildings. In particular, the laminated glass produced by use of the white-colored interlayer for laminated glass allows the transmittance of visible light but cannot permit the persons or objects existing behind it to be visually identified, and consequently is suitably utilizable in the locations where privacy protection is particularly required to be ensured, such as lighting windows, bathroom doors, and panels or wainscots for balconies.

(Effect of the Fourth Invention)

Since the interlayer for laminated glass according to the fourth invention comprises the above-described sound-insulating polyvinyl acetal resin layer and opaque polyvinylacetal resin layer being laminated together, and shows excellent light-shielding property, the laminated glass produced by use of the interlayer can cut off through absorption or reflectance the infrared radiation (heat-ray) with particularly great thermal effect among the rays of light entering through the laminated glass originating from sunlight, etc., while it suppresses temperature rises in the sound-insulating polyvinyl acetal resin layer and also temperature rises in the inside of automobiles and rooms of buildings, and this can securely prevent temperature rises in the sound-insulating interlayer for laminated glass and therefore the deterioration in sound-insulating property, as well.

The interlayer for laminated glass according to the fourth invention, which utilizes the tinted layer colored with inorganic fine particles, exhibits excellent weatherability and is resistant to deterioration in terms of such optical characteristics as Haze value, physical strength of the interlayer, etc.

The interlayer for laminated glass according to the fourth invention, which utilizes the tinted layer colored with achromatic inorganic fine particles, can produce the effect of development of much more subdued color tone.

Because the interlayer for laminated glass according to the fourth invention comprises the opaque polyvinyl acetal resin layer being laminated, the laminated glass produced by use of such interlayer is suitably usable in the application fields where the light-shielding property is particularly required, among the roof and side-window panes of automobiles except windshields, or panes for buildings. In particular, the laminated glass produced by use of the white-colored interlayer for laminated glass allows the transmittance of visible light but cannot permit the persons or objects existing behind it to be visually identified, and consequently is suitably utilizable in the locations where privacy protection is particularly required to be ensured, such as lighting windows, bathroom doors, and panels or wainscots for balconies.

In cases where the laminated glass according to the fourth invention is used for automobiles and buildings in the places or spots in contact with the outdoor environment, the interlayer for laminated glass according to the fourth invention desirably has the laminate construction in which the above-mentioned opaque polyvinyl acetal resin layer is so arranged as to be on the outdoor side.

When the interlayer for laminated glass according to the fourth invention comprises the conventionally known sound-insulating polyvinyl acetal resin layer, especially two kinds of plasticized polyvinyl acetal resin layers being laminated as a sound-insulating polyvinyl acetal resin layer, the internal friction effect between two of the respective resin layers having different viscoelastic properties can permit sound energy to be effectively converted and absorbed into heat energy, and the sound-insulating property can be prevented from deterioration caused by the coincidence effect at the middle to high frequencies of about 2,000 to 5,000 Hz.

BEST MODE FOR CARRYING OUT THE INVENTION

The interlayer for laminated glass of the present invention is characterized in that said interlayer comprises at least one layer composed of an opaque EVA resin composition or an opaque polyvinyl acetal resin composition.

(Opaque EVA Resin Composition)

The opaque EVA resin composition to be used in the present invention can be produced by mixing and dispersing an appropriate amount of fine-particle inorganic powder in an EVA resin.

The EVA resin is a non-crosslinked ethylene-vinyl acetate copolymer resin or a high-temperature crosslinked ethylene-vinyl acetate copolymer resin. As the EVA resin, use can be made of modified ethylene-vinyl acetate resins, such as saponified ethylene-vinyl acetate copolymers. To produce a variety of such EVA resins as mentioned above, there can be adopted the conventionally known methods.

The ethylene-vinyl acetate copolymers (EVA) show a vinyl-acetate content of 20 to 40wt % as measured in accordance with JISK6730 "Testing Methods for Ethylene/Vinyl Acetate Resin Materials". When the vinyl acetate content is less than 20 wt %, the resultant interlayer is so hard that its adhesion to a glass sheet is impaired, while the laminated glass produced exhibits deteriorated penetration resistance. When the vinyl-acetate content exceeds 40 wt %, on the other hand, the resultant interlayer has poor breaking strength so that the laminated glass produced shows inferior impact resistance.

As examples of the fine-particle inorganic powder to be used for producing the EVA resin composition, there may be mentioned calcium carbonate, alumina, kaolin clay, calcium silicate, magnesium oxide, magnesium hydroxide, aluminum hydroxide, magnesium carbonate, talc, feldspar powder, mica, baryte, bariumcarbonate, titaniumoxide, silica, and glass beads. Such fine-particle inorganic powder may be used singly or as mixtures of two or more thereof. It is to be noted that the above-mentioned fine-particle inorganic powder is preferably opacifiers, more preferably calcium carbonate or silica, most preferably calcium carbonate.

The fine-particle inorganic powder to be used for producing the EVA resin compositions preferably have an average particle size in the range of 0.1 to 100 μm, more preferably in the range of 0.1 to 50 μm. The average particle sizes of the fine-particle inorganic powder can be measured by the dynamic light scattering method using a light scattering instrument (e.g., "DLS-6000AL" manufactured by Otsuka Electronics Co., Ltd.) and an Ar laser as a light source. The above-mentioned fine-particle inorganic powder is generally used at ratios in the range of 0.3 to 30 parts by weight, preferably in the range of 0.5 to 20 parts by weight, per 100 parts by weight of the EVA resin, so that the opaque EVA resin compositions may be produced.

(Opaque Polyvinyl Acetal Resin Composition)

The above-mentioned opaque polyvinyl acetal resin composition can be usually produced by mixing and dispersing an appropriate amount of each of a plasticizer and fine-particle inorganic powder in a polyvinyl acetal resin. The opaque polyvinyl acetal resin composition may be, but is not specifically limited to, any one obtained by mixing and dispersing an appropriate amount of fine-particle inorganic powder in a polyvinyl acetal resin composition containing for example not less than 45 parts by weight of a plasticizer per 100 parts by weight of a known polyvinyl acetal resin as used conventionally for an interlayer for sound-insulating laminated glass. Namely, the opaque polyvinyl acetal resin composition may be any polyvinyl acetal resin compositions containing fine-particle inorganic powder and not less than 45 parts by weight of a plasticizer per 100 parts by weight of a polyvinyl acetal resin.

The plasticizer to be used for producing the polyvinyl acetal resin composition is not particularly limited, and conventionally known plasticizers generally used for producing this type of interlayers can be used. Preferred examples of such plasticizers include triethylene glycol-di-2-ethylbutyrate (3GH), triethylene glycol-di-2-ethylhexanoate (3GO), triethyleneglycol-di-n-heptanoate (3G7), tetraethyleneglycol-di-2-ethylhexanoate (4GO), tetraethylene glycol-di-n-heptanoate (4G7), and oligoethylene glycol-di-2-ethylhexanoate (NGO), etc. Such plasticizers are generally used at ratios in the range of 25 to 70 parts by weight per 100 parts by weight of the polyvinyl acetal resin.

The fine-particle inorganic powder to be used for producing the above-mentioned opaque polyvinyl acetal resin composition may be the same as those described above for producing the opaque EVA resin compositions.

The fine-particle inorganic powder is generally used at ratios in the range of 0.3 to 30 parts by weight, preferably in the range of 0.5 to 20 parts by weight, per 100 parts by weight of the polyvinyl acetal resin so that the opaque polyvinylacetal resin film may be produced.

Particularly, the above-mentioned opaque polyvinyl acetal resin composition is easy to be obtained in the subdued color tone, since most of the above-mentioned fine-particle inorganic powder is achromatic (white, light gray, gray, blackish gray, black).

(Optional Components)

The above-mentioned opaque EVA resin composition or opaque polyvinyl acetal resin composition may further be admixed with light shielding agents, a variety of coloring agents (e.g., pigments or dyes), etc., as the case may be.

Examples of the light shielding agents include carbon black, red iron oxide, and the like. As the coloring agents, pigments are preferably used, and examples of such pigments include a dark red-brown mixed pigment produced by mixing four pigments, i.e. a black pigment of carbon black, a red pigment of C.I.Pigment red, a blue pigment of C.I.Pigment blue, and a yellow pigment of C.I.Pigment yellow.

Furthermore, the above-mentioned opaque EVA resin composition or the opaque polyvinyl acetal resin composition may be incorporated with various additives generally used for producing this type of interlayers, such as UV absorbers, antioxidants, adhesion regulating agents, plasticizers, and the like, as the case may be.

Preferred examples of the UV absorber include 2-(2'-hydroxy-5'-methylphenyl)benzotriazole (e.g., "TINUVIN P" manufactured by CIBA-GEIGY Co.), 2-(2'-hydroxy-3',5'-di-t-methylphenyl)benzotriazole (e.g., "TINUVIN 320" manufactured by CIBA-GEIGY Co.), 2-(2'-hydroxy-3'-t-butyl-5'-methyl-phenyl)-5-chlorobenzotriazole (e.g., "TINUVIN 326" manufactured by CIBA-GEIGY Co.), and 2-(2'-hydroxy-3',5'-di-amylphenyl)-benzotriazole (e.g., "TINUVIN 328" manufactured by CIBA-GEIGY Co.). Alternatively, hindered amine light stabilizers such as "ADEKA STAB LA-57" manufactured by Adeka Argus Co.) is also preferable.

Preferred examples of the antioxidant include t-butyl hydroxytoluene (e.g., "Sumilizer BHT" manufactured by Sumitomo Chemical Co.) and tetrakis-[methylene-3-(3',5'-di-t-butyl-4'-hydroxyphenyl)propionate]methane (e.g., "IRGANOX 1010" manufactured by CIBA-GEIGY Co.).

Preferred examples of the adhesion regulating agent include alkali metal salts or alkaline earth metal salts of organic or inorganic acids.

Examples of the plasticizer to be used for the above-mentioned EVA resin composition include, for example, phthalic acid esters such as dioctyl phthalate (DOP), dibutyl phthalate (DBP) and diisodecyl phthalate (DIDP); adipic acid esters such as di-2-ethylhexyl adipate (DOA) and diisodecyl adipate (DIDA); sebacic acid esters such as dibutyl sebacate (DBS) and di-2-ethylhexylsebacate (DOS); phosphoricacidesters such as tricresyl phosphate (TCP) and trioctyl phosphate (TOP); and epoxidized soybean oil.

The interlayer for laminated glass of the present invention is not particularly limited, as long as it is composed of the above-mentioned opaque EVA resin composition or opaque polyvinyl acetal resin composition, and may comprise a single layer or multiple layers. In the case of the multiple layers, for example, a layer composed of the above-mentioned opaque EVA resin composition or polyvinyl acetal resin composition may furthermore be laminated with a plural number of layers composed of EVA resin compositions or polyvinyl acetal resin compositions each having the same or different composition and miscellaneous opaque resin compositions, or may be laminated with layers composed of, for example, transparent resin compositions or sound-insulating resin compositions.

Taking into consideration the minimum magnitudes of penetration resistance and weatherability required of the laminated glass, the interlayer for laminated glass according to the present invention preferably shows a total film thickness in the range of 0.3 to 1.6 mm for practical reasons, as is the same with the conventional transparent interlayers for laminated glass.

The interlayer for laminated glass composed of the above-mentioned opaque EVA resin composition or the opaque polyvinyl acetal resin composition can be produced by kneading (I) the above-mentioned EVA resin and the above-mentioned fine-particle inorganic powder, as well as a variety of additives to be added if required, or (II) the above-mentioned polyvinyl acetal resin composition, the above-mentioned plasticizer and the above-mentioned fine-particle inorganic powder, as well as a variety of additives to be added if required, with an extruder, a plastograph, a kneader, a banbury mixer, or a calender roll, etc., followed by film-forming into the sheet form by the conventional film forming processes, such as the extrusion, calendering and press processes.

The laminated glass of the present invention can be produced using the same process as used for producing the conventional laminated glass. For example, the laminated glass can be manufactured, by sandwitching the above-described interlayer for laminated glass between at least two transparent glass sheets, passing them through pressure rolls or placing them in a rubber bag, followed by vacuum suction, to give a laminated body through the preliminary bonding of the interlayer with the glass sheets at about 70 to 110° C., while removing the air remaining between the glass sheet and the interlayer and placing the deaerated laminated body in an autoclave or subjecting it to pressing to carry out the final bonding at about 120 to 150° C. under applied pressure of about 1 to 1.5 MPa.

It is to be noted that the transparent glass sheets to be used in the present invention are not particularly limited, and that any transparent glass sheets generally used can be used. Examples of such transparent glass sheets include various kinds of inorganic glass sheets such as float plate glass sheets, heat-absorbing glass sheets, polished glass sheets, template glass sheets, wire plate glass sheets, and line plate glass sheets, and organic glass sheets such as polycarbonate sheets and polymethyl methacrylate sheets. These glass sheets may be used singly or in combination of two or more thereof. Among them, heat-absorbing glass sheets are preferably used. It is to be noted that the thickness of such glass sheets is not particularly limited and can be appropriately selected according to their intended use, although it is desirably in the range of 1 to 3 mm.

The thus obtained laminated glass of the present invention has a low visible light transmittance suitable for privacy protection.

(The First Invention)

To be described below is the first invention as a preferred embodiment of the present invention.

An interlayer for laminated glass of the first invention is characterized in that said interlayer is composed of an opaque EVA resin composition containing fine-particle inorganic powder and heat-ray shielding fine particles.

In the first invention, such an opaque EVA resin composition can be obtained by mixing and dispersing an appropriate amount of each of the above-mentioned fine-particle inorganic powder and heat-ray shielding fine particles in the above-described EVA resin. Examples of the fine-particle inorganic powder to be used in the first invention include calcium carbonate, alumina, kaolin clay, calcium silicate, magnesium oxide, magnesium hydroxide, aluminum hydroxide, magnesium carbonate, talc, feldsparpowder, mica, baryte, bariumcarbonate, titaniumoxide, silica, and glass beads, etc. These may be used singly or as mixtures of two or more thereof. It is to be noted that the above-mentioned fine-particle inorganic powder is preferably opacifiers, more preferably calcium carbonate or silica, most preferably calcium carbonate.

Examples of the heat-ray shielding fine particles to be used in the first invention include tin-doped indium oxide (ITO), antimony-doped tin oxide (ATO), aluminum-doped zinc oxide (AZO), indium-doped zinc oxide (IZO), tin-doped zinc oxide, silicon-doped zinc oxide, zinc antimonate, lanthanum hexaboride, cerium hexaboride, fine gold powder, fine silver powder, fine platinum powder, and fine aluminum powder. Among them, ITO is preferable.

The average particle sizes of the fine-particle inorganic powder and the heat-ray shielding fine particles to be used in the first invention are preferably in the range of 0.1 to 100 am, more preferably in the range of 0.1 to 50 μm. These average particle sizes can be measured by the dynamic light scattering method using a light scattering instrument (e.g., "DLS-6000AL" manufactured by Otsuka Electronics) and an Ar laser as a light source. The above-mentioned fine-particle inorganic powder is generally used at ratios in the range of 0.3 to 30 parts by weight, preferably in the range of 0.5 to 20 parts by weight, per 100 parts by weight of the EVA resin so that the opaque EVA resin composition may be produced. The above-mentioned heat-ray shielding fine particles are usually used at ratios in the range of 0.001 to 30 parts by weight, preferably in the range of 0.001 to 10 parts by weight, more preferably in the range of 0.005 to 5 parts by weight, per 100 parts by weight of the EVA resin.

It is to be noted that when the fine-particle inorganic powder to be used in the first invention is calcium carbonate, the average particle size of said inorganic powder is preferably in the range of 0.5 to 10 μm, and the calcium carbonate content in the interlayer for laminated glass preferably is in such a range as may satisfy the following equation (1), more preferably the following equation (2).

Calcium carbonate content in the interlayer (wt %)×thickness of the interlayer (mm)=1.0 to 3.0,  Equation (1):

Calcium carbonate content in the interlayer (wt %)×thickness of the interlayer (mm) =1.5 to 2.5  Equation (2):

Particularly, the above-mentioned opaque EVA resin composition is easy to be obtained in the subdued color tone, since most of the fine-particle inorganic powder is achromatic (white, light gray, gray, blackish gray, black).

The above-mentioned opaque EVA resin composition may further be incorporated with light shielding agents, coloring agents (e.g., pigments or dyes), etc., as the case may be.

Furthermore, the above-mentioned opaque EVA resin composition may be incorporated with a variety of additives generally used for producing this type of interlayers, such as UV absorbers, antioxidants, adhesion regulating agents, and plasticizers, as the case may be.

The interlayer for laminated glass according to the first invention of the present invention is not particularly limited, only if it is composed of the above-mentioned opaque EVA resin composition, and may comprise a single layer or multiple layers. In the case of multiple layers, for example, a layer composed of the above-mentioned opaque EVA resin composition may be laminated with a plural number of layers composed of EVA resin compositions or miscellaneous opaque resin compositions each having a different composition, or layers comprising transparent resin compositions or sound-insulating resin compositions.

Taking into consideration the minimum levels or magnitudes of penetration resistance and weatherability required of the laminated glass, the interlayer for laminated glass according to the present invention preferably shows a total film thickness in the range of 0.3 to 1.6 mm for practical reasons, as is the same with the conventional transparent interlayers for laminated glass.

The interlayer for laminated glass composed of the above-mentioned opaque EVA resin composition or opaque polyvinyl acetal resin composition can be produced by kneading the above-mentioned EVA resin, the above-mentioned fine-particle inorganic powder, and various additives to be added as the case may be, with an extruder, a plastograph, a kneader, a banbury mixer, or a calender roll, followed by film-forming into the sheet form by the conventional film forming process, such as the extrusion, calendering and press processes.

The laminated glass of the first invention can be produced using the same process as used for producing the conventional laminated glass. For example, the laminated glass can be manufactured by sandwiching the above-described interlayer for laminated glass between at least two transparent glass sheets, passing them through pressure rolls or placing them in a rubber bag, followed by vacuum suction, to give a laminated body through the preliminary bonding of the interlayer with the glass sheets at about 70 to 110° C., while removing the air remaining between the glass sheet and the interlayer, and placing the deaerated laminated body in an autoclave or subjecting the same to pressing to carrying out the final bonding at about 120 to 150° C. under applied pressure of about 1 to 1.5 MPa.

It is to be noted that the transparent glass sheets to be used in the present invention are not particularly limited, and that any transparent glass sheets generally used can be used. Examples of such transparent glass sheets include various kinds of inorganic glass sheets such as float plate glass sheets, heat-absorbing glass sheets, polished glass sheets, template glass sheets, wire plate glass sheets, and line plate glass sheets, and organic glass sheets such as polycarbonate plates or sheets and polymethyl methacrylate plates or sheets. These glass sheets may be used singly or in combination of two or more thereof. Among them, heat-absorbing glass sheets are preferably used. It is to be noted that the thickness of glass sheets is not particularly limited and can be appropriately selected according to their intended use, although it is desirably in the range of 1 to 3 mm per glass sheet.

The thus produced laminated glass of the first invention has a low visible light transmittance suited for privacy protection, namely a visible light transmittance of not more than 2.5%, and furthermore not more than 2%. Additionally, the laminated glass do neither encounter the problem of uneven coloring caused by agglomeration or poor dispersion of fine-particle inorganic powder (especially opacifier) nor create the problem of formation of fine air bubbles caused by deteriorated interface adhesion due to the fine-particle inorganic powder (especially opacifier) present at the interface between the glass sheet and the interlayer.

(The Second Invention)

To be described below is the second invention as a preferred embodiment of the present invention.

The interlayer for laminated glass according to the second invention is characterized in that said interlayer is composed of an opaque and sound-insulating polyvinyl acetal resin composition containing fine-particle inorganic powder.

The interlayer for laminated glass according to the second invention is characterized in that the opaque and sound-insulating polyvinyl acetal resin composition further contains heat-ray shielding fine particles.

In the second invention, such opaque and sound-insulating polyvinyl acetal resin composition can be produced by mixing and dispersing an appropriate amount of each of a plasticizer and fine-particle inorganic powder in a polyvinyl acetal resin. The polyvinyl acetal resin composition is not limited particularly, and an appropriate amount of fine-particle inorganic powder may be dispersed through mixing in a known sound-insulating polyvinyl acetal resin composition being conventionally used as an interlayer for sound-insulating laminated glass, for example, a polyvinyl acetal resin composition containing not less than 45 parts by weight of a plasticizer per 100 parts by weight of polyvinyl acetal resin. Namely, the opaque and sound-insulating polyvinyl acetal resin composition may be a polyvinyl acetal resin composition containing fine-particle inorganic powder and not less than 45 parts by weight of a plasticizer per 100 parts by weight of polyvinyl acetal resin.

It is to be noted that the interlayer for laminated glass according to the second invention may be laminated with a plural number of layers of an opaque and sound-insulating polyvinyl acetal resin composition having a different composition. In this case, sound energy is effectively converted and absorbed into heat energy due to the internal friction effect between the two resin layers having different viscoelastic properties, and particularly, the sound-insulating property can be prevented from deterioration caused by the coincidence effect at the middle to high frequencies of about 2,000 to 5,000 Hz.

The opaque and sound-insulating polyvinyl acetal resin composition according to the second invention may further be admixed with heat-ray shielding fine particles, as the case may be.

The laminated glass having transparent glass sheets bonded to both sides of the thus obtained interlayer for laminated glass preferably shows a haze value of not less than 20%, particularly preferably not less than 50%, more preferably not less than 60%. When the haze value of the laminated glass is less than 20%, scattering of visible light diminishes, thereby impairing the light shielding property of the laminated glass.

Examples of the fine-particle inorganic powder to be used in the second invention include calcium carbonate, alumina, kaolin clay, calcium silicate, magnesium oxide, magnesium hydroxide, aluminum hydroxide, magnesium carbonate, talc, feldspar powder, mica, baryte, barium carbonate, titanium oxide, silica, and glass beads, and these may be used singly or as mixtures thereof.

Examples of the heat-ray shielding fine particles to be used in the second invention include tin-doped indium oxide (ITO), antimony-doped tin oxide (ATO), aluminum-doped zinc oxide (AZO), indium-doped zinc oxide (IZO), tin-doped zinc oxide, silicon-doped zinc oxide, zinc antimonate, lanthanum hexaboride, cerium hexaboride, fine gold powder, fine silver powder, fine platinum powder, and fine aluminum powder.

The average particle size of the fine-particle inorganic powder or the heat-ray shielding fine particles to be used in the second invention are preferably in the range of 1 to 100 µm, more preferably in the range of 1 to 50 µm. These average particle sizes can be measured by the dynamic light scattering method using a light scattering instrument (e.g., "DLS-6000AL" manufactured by Otsuka Electronics) and an Ar laser as a light source. The fine-particle inorganic powder is generally used at ratios in the range of 0.3 to 30 parts by weight, preferably in the range of 0.5 to 20 parts by weight, per 100 parts by weight of the polyvinyl acetal resin, so that the opaque polyvinyl acetal resin film may be produced. The heat-ray shielding fine particles are usually used at ratios in the range of 0.001 to 30 parts by weight, preferably in the range of 0.001 to 10 parts by weight, more preferably in the range of 0.005 to 5 parts by weight, per 100 parts by weight of the polyvinyl acetal resin.

Particularly, the opaque and sound-insulating polyvinyl acetal resin composition to be used in the second invention is easy to be obtained in the subdued color tone, since many of the fine-particle inorganic powder is achromatic (white, light gray, gray, blackish gray, black).

Taking into consideration the minimum levels or magnitudes of penetration resistance and weatherability required of the laminated glass, the interlayer for laminated glass according to the second invention preferably shows a total film thickness in the range of 0.3 to 1.6 mm for practical reasons, as is the same with the conventional transparent interlayers for laminated glass.

The opaque and sound-insulating polyvinyl acetal resin composition can be produced by kneading the above-mentioned polyvinyl acetal resin, the above-mentioned plasticizer and a variety of additives to be added, as the case may be, with an extruder, a plastograph, a kneader, a banbury mixer or a calender roll, followed by film-forming by the conventional film forming process, such as the extrusion, calendering and press processes.

The laminated glass of the second invention can be produced using the same process as used for producing the conventional laminated glass, for example, by sandwitching the above-described interlayer for laminated glass between at least two transparent glass sheets, passing them through pressure rolls or placing them in a rubber bag, followed by vacuum suction to give a laminated body through the preliminary bonding of the interlayer with the glass sheets at about 70 to 110° C., while removing the air remaining between each glass sheet and the interlayer, and placing the deaerated laminated body in an autoclave or subjecting the same to pressing to carry out the final bonding at about 120 to 150° C. under applied pressure of about 1 to 1.5 MPa.

It is to be noted that the transparent glass sheets to be used in the second invention are not particularly limited, and that any transparent glass sheets generally used can be used. Examples of such transparent glass sheets include various kinds of inorganic glass sheets such as float plate glass sheets, heat-absorbing glass sheets, polished glass sheets, template glass sheets, wire plate glass sheets, and line plate glass sheets, and various organic glass plates or sheets such as polycarbonate plates and polymethyl methacrylate plates. These glass sheets may be used singly-or in combination of two or more thereof. Among them, heat-absorbing glass sheets are preferably used. It is to be noted that the thickness of each glass sheet to be used in the second invention is not particularly limited and can be appropriately selected according to their intended use, although it is desirably in the range of 1 to 3 mm.

(The Third Invention)

The interlayer for laminated glass according to the third invention is characterized in that said interlayer comprises a laminate structure of at least two layers consisting of an opaque and sound-insulating polyvinyl acetal resin layer(A) containing fine-particle inorganic powder and a transparent polyvinyl acetal resin layer (B).

In the third invention, a polyvinyl acetal resin to be used for the opaque and sound-insulating polyvinyl acetal resin layer (A) is not particularly limited, and although use can be made of any polyvinyl acetal resins used for producing a known sound-insulating polyvinyl acetal resin films conventionally used as an interlayer for sound-insulating laminated glass, particularly, the polyvinyl acetal resin, which is used for a sound-insulating polyvinyl acetal resin layer, as described in Japanese Patent No. 2703471, is preferably used.

Namely, use is preferably made of polyvinyl acetal resins (a) with a vinyl acetate content (residual acetyl groups) of 8 to 30 mol % obtained by acetalization of a polyvinyl alcohol with an aldehyde having 4 to 6 carbon atoms.

The opaque and sound-insulating polyvinyl acetal resin layer (A) to be used in the third invention may be composed of an opaque and sound-insulating polyvinyl acetal resin composition, which polyvinyl acetal resin composition may be any polyvinyl acetal resin compositions containing fine-particle inorganic powder and 45 parts by weight or more of a plasticizer per 100 parts by weight of a polyvinyl acetal resin.

The opaque and sound-insulating polyvinyl acetal resin layer (A) to be used in the third invention can be produced by furthermore mixing and dispersing at least an appropriate amount of fine-particle inorganic powder in the resin composition containing the polyvinyl acetal resin as described above and a plasticizer. In addition to the plasticizer and the fine-particle inorganic powder, heat-ray shielding fine particles, light shielding agents, UV absorbers, dyes, pigments, etc. may be added, as the case may be.

It is to be noted that the resin layer (A) may be formed by the lamination of a plural number of thin films. For example, use of the laminate, which comprises the interlayer for laminated glass according to the third invention being laminated with layers of the known sound-insulating polyvinyl acetal resin, especially two kinds of plasticized polyvinyl acetal resins, being used as a sound-insulating polyvinyl acetal resin layer, can allow the sound energy to be effectively converted and absorbed into the heat energy due to the internal friction effect produced between resin layers having different viscoelastic properties, and particularly permits the sound-insulating property to be prevented from deterioration due to the coincidence effect in the middle to high sound region at 2,000 to 5,000 Hz.

In the third invention, an opaque polyvinyl acetal resin layer may be produced by mixing and dispersing an appropriate amount each of a plasticizer and fine-particle inorganic powder in a sound-insulating polyvinyl acetal resin. The polyvinyl acetal resin layer (A) may be composed of any opaque polyvinyl acetal resins being further admixed with heat-ray shielding fine particles, light shielding agents, a variety of dyes and pigments, etc.

In the third invention, a laminate construction consisting of at least two layers of an opaque and sound-insulating polyvinyl acetal resin layer (A) and a transparent polyvinyl acetal resin layer (B) is utilized as an interlayer for laminated glass.

The construction of the transparent polyvinyl acetal resin layer (B) is not particularly limited, and is exemplified by a polyvinyl acetal resin layer composed of a resin composition having an appropriate amount of a plasticizer dispersed through mixing in a known polyvinyl acetal resin conventionally used as an interlayer for laminated glass. Particularly, use is desirably made of a transparent polyvinyl acetal resin layer (B) composed of a polyvinyl acetal resin (b) with a vinyl acetate content (residual acetyl groups) of not more than 14 mol % produced by acetalization of a polyvinyl alcohol with an aldehyde having 3 to 4 carbon atoms and a plasticizer. The resin composition constituting the polyvinyl acetal resin layer (B) may be furthermore admixed with heat-ray shielding fine particles, a variety of dyes and pigments, etc., as the case may be.

The interlayer for laminated glass of the third invention comprises the resin layer (A) and resin layer (B) as the essential components, whereby a layer (C) of a resin other than polyvinyl acetal resins may be laminated therebetween, as the case may be. Examples of such resin layer (C) include layers of resins, such as polyester, polyurethane and ethylene vinyl acetate resins.

The order of stacking these resin layers (A), (B) and (C) which constitute the interlayer for laminated glass according to the third invention is not particularly limited, but these resin layers are preferably stacked in such a manner that the resin layer (A) may constitute an intermediate layer, while at least one resin layer (B) may make up the outermost surface layer, whereby use can be made of any arbitrary constructions, such as(B)/(A)/(B), (B)/(A), (B)/(C)/(A)/(B), (B)/(C)/(A)/(C)/(B), and the like. From the viewpoint of secured ease of handling, preferred is the interlayer for laminated glass having the construction in which the resin layer (B) makes up the outermost layer.

The laminated glass produced by bonding transparent glass sheets to both sides of the thus obtained interlayer for laminated glass desirably shows a haze value of not less than 20%, particularly preferably not less than 50%, more preferably not less than 60%. When the haze value of the laminated glass falls beneath 20%, scattering of visible light diminishes, thereby impairing the light shielding property of the laminated glass.

Examples of the fine-particle inorganic powder to be used in the third invention include calcium carbonate, alumina, kaolin clay, calcium silicate, magnesium oxide, magnesium hydroxide, aluminum hydroxide, magnesium carbonate, talc, feldspar powder, mica, baryta, barium carbonate, titanium oxide, silica, and glass beads. These fine-particle inorganic powder may be used singly or in combination of two or more of them.

Examples of the heat-ray shielding fine particles to be used in the third invention include tin-doped indiumoxide (ITO), antimony-doped tin oxide (ATO), aluminum-doped zincoxide (AZO), indium-doped zinc oxide (IZO), tin-doped zinc oxide, silicon-dopedzincoxide, zincantimonate, lanthanumhexaboride, cerium hexaboride, fine gold powder, fine silver powder, fine platinum powder, and fine aluminum powder. Examples of the light shielding agents include carbon black and red iron oxide. Examples of the pigments include dark red-brown pigments obtained by mixing four pigments, namely carbon black of a black pigment, a red pigment (C.I.Pigment red), a blue pigment (C.I.Pigment blue) and a yellow pigment (C.I.Pigment yellow).

The average particle size of the fine-particle inorganic powder to be used in the third invention is preferably in the range of 1 to 100 μm, more preferably in the range of 1 to 50 μm. Such average particle size can be measured by the dynamic light scattering method using a light scattering instrument (e.g., "DLS-6000AL" manufactured by Otsuka Electronics) and an Ar laser as a light source. The amount of the fine-particle inorganic powder is generally used at ratios in the range of 0.3 to 30 parts by weight, preferably in the range of 0.5 to 20 parts by weight, per 100 parts by weight of the polyvinyl acetal resin, so that the transparent polyvinyl acetal resin film may be produced. The heat-ray shielding fine particles are usually used at ratios in the range of 0.001 to 30 parts by weight, preferably in the range of 0.001 to 10 parts by weight, more preferably in the range of 0.005 to 5 parts by weight, per 100 parts by weight of the polyvinyl acetal resin.

Particularly, the above-described opaque and sound-insulating polyvinyl acetal resin layer is easy to be produced in the subdued color tone, since most of the fine-particle inorganic powder is achromatic (white, light gray, gray, blackish gray, black).

Taking into consideration the minimum levels or magnitudes of penetration resistance and weatherability required of the laminated glass, in general, the interlayer for laminated glass according to the third invention preferably shows a total film thickness in the range of 0.3 to 1.6 mm for practical reasons, as is the same with the conventional transparent interlayers for laminated glass.

The above-described sound-insulating polyvinyl acetal resin layer can be produced by kneading the above-described polyvinyl acetal resin, the above-mentioned plasticizer, and a variety of additives to be added, as the case may be, with an extruder, a plastograph, a kneader, a banbury mixer or a calender roll, followed by film-forming into the sheet form by the conventional film forming process such as the extrusion, calendering and press processes.

The opaque and sound-insulating polyvinyl acetal resin layer can be produced by kneading the above-described polyvinyl acetal resin, the above-mentioned fine-particle inorganic powder, the above-mentioned plasticizer, and the above-described opacifier, as well as heat-ray shielding fine particles, inorganic fine particles such as various pigments and a variety of additives to be added, as the case may be, with an extruder, a plastograph, a kneader, a banbury mixer, or a calender roll, followed by film forming into the sheet form by the conventional film forming process such as the extrusion, calendaring and press processes.

The interlayer for laminated glass according to the third invention can be produced by stacking the opaque and sound-insulating polyvinyl acetal resin layer and the transparent polyvinyl acetal resin layer as individually formed separately in the above-described, and applying heat and pressure to integrate the layer assembly into one structural member. Also, the interlayer may be produced by film-forming through the multiple-layer extrusion process into one structural member a film-forming resin composition for forming the above-described opaque and sound insulting polyvinyl acetal resin layer, a film-forming resin composition for forming a transparent polyvinyl acetal resin layer, and optionally a resin composition for forming a transparent polyvinyl acetal resin layer. As an alternative production process, the interlayer may be produced concurrently with the production of the laminated glass by stacking the opaque and sound-insulating polyvinyl acetal resin layer, the transparent polyvinyl acetal resin layer, and a transparent polyvinyl acetal resin layer, if necessary, between two glass sheets, followed by heating and compressing to be integrated into one structural member.

The laminated glass of the third invention can be produced using the same method as used for producing conventional laminated glass. For example, the laminated glass is produced by sandwiching the above-described interlayer for laminated glass between at least two transparent glass sheets, then passing them through pressure rolls or placing them in a rubber bag, followed by vacuum suction to give a laminated body through the preliminary bonding of the interlayer with the glass sheets at about 70 to 110° C., while removing air remaining between the glass sheets and the interlayer, and placing the deaerated laminated body in an autoclave or subjecting the same to pressing to carry out the final bonding at about 120 to 150° C. under an applied pressure of about 1 to 1.5 MPa.

It is to be noted that the transparent glass sheets are not particularly limited, and transparent glass sheets generally used can be used. Examples of such transparent glass sheets include various kinds of inorganic glass sheets, such as float plate glass sheets, heat-absorbing glass sheets, polished plate glass sheets, template glass sheets, wire plate glass sheets and line plate glass sheets, and various organic glass plates or sheets, such as polycarbonate plates or sheets and polymethyl methacrylate plates or sheets. These glass sheets may be used singly or in combination of two or more thereof. Among them, heat-absorbing glass sheets are preferably used. It is to be noted that the thickness of such glass sheets is not particularly limited and can be appropriately selected depending upon their intended use, although it is desirably in the range of 1 to 3 mm.

(The Fourth Invention)

The interlayer for laminated glass of the fourth invention is characterized in that said interlayer comprises a sound-insulating polyvinyl acetal resin layer being laminated with an opaque polyvinyl acetal resin layer.

In the fourth invention, the sound-insulating polyvinyl acetal resin layer is not particularly limited, and there is preferably used, for example, the known sound-insulating polyvinyl acetal resin layers conventionally used as an interlayer for sound-insulating laminated glass. Particularly, use is preferably made of a sound-insulating polyvinyl acetal resin layer as described in the above-mentioned Official Gazette of Japanese Patent No. 2703471.

Namely, it is particularly preferable to use, as a sound-insulating polyvinyl acetal resin layer (A), at least one resin layer composed of a polyvinyl acetal resin (a) with a vinyl acetate content (residual acetyl groups) of 8 to 30 mol %, as produced by acetalization of a polyvinyl alcohol with an aldehyde having 4 to 6 carbon atoms, and a plasticizer.

The above-described sound-insulating polyvinyl acetal resin layer may be composed of a sound-insulating polyvinyl acetal resin composition, and said sound-insulating polyvinyl acetal resin composition may be a polyvinyl acetal resin composition which contains 45 parts by weight or more of a plasticizer per 100 parts by weight of a polyvinyl acetal resin.

Also, in the fourth invention, the resin which constitutes the opaque polyvinyl acetal resin layer is not particularly limited, and there can be used the known polyvinyl acetal resins being conventionally used as an interlayer for laminated glass. Such resins can be admixed for dispersion with an appropriate amount each of a plasticizer and inorganic fine particles (coloring agent) to thereby form opaque polyvinyl acetal resin layers. It is preferable to use opaque polyvinyl acetal resin layers (B) composed of the above-described polyvinyl acetal resins (b) with a vinyl acetate content (residual acetyl groups) of not more than 14 mol %, as produced by acetalization of a polyvinyl alcohol with an aldehyde having 3 to 4 carbon atoms, a plasticizer, and inorganic fine particles (coloring agent) such as opacifiers, heat-ray shielding fine particles, light shielding agents, a variety of dyes and pigments.

When the sound-insulating polyvinyl acetal resin layer is colored, there may be contained inorganic fine particles (coloring agent), such as opacifiers, heat-ray shielding fine particles, light shielding agents, dyes and pigments.

In the fourth invention, a laminate of a sound-insulating polyvinyl acetal resin layer (A) and an opaque polyvinyl acetal resin layer (B) is used as the interlayer for laminated glass and may further be laminated with a transparent polyvinyl acetal resin layer. The composition of such transparent polyvinyl acetal resin layer is not particularly limited and there is used a resin layer, as obtained by mixing and dispersing an appropriate amount of a plasticizer in a known polyvinyl acetal resin conventionally used as an interlayer for laminated glass. Particularly, it is preferred to use the transparent polyvinyl acetal resin layer (C) composed of the above-described polyvinyl acetal resin (b) and a plasticizer.

In the fourth invention, the interlayer for laminated glass of the fourth invention can be produced by lamination of the resin layer (A) and the resin layer (B) as essential components, as well as a resin layer (C), if necessary, and the order of stacking these resin layers is not particularly limited, only if the resultant laminate has at least one layer out of the resin layer (A) and resin layer (B). There can be employed any arbitrary layer-assembly constructions, such as (B)/(A)/(B), (B)/(A)/(C), (A)/(C)/(B), (C)/(A)/(C)/(B), and the like. From the view point of secured ease of handling for the interlayer for laminated glass, particularly preferred is the interlayer having the layer-assembly construction in which the resin layer (B) or the resin layer (C) makes up the outermost surface layer.

The haze value of the laminated glass, as produced in the above-described manner by bonding transparent glass sheets to both sides of the thus obtained interlayer for laminated glass, is preferably not less than 20%, particularly preferably not less than 50%, more preferably not less than 60%. If the haze value of the laminated glass is less than 20%, scattering of visible light diminishes, so that the light shielding property of the laminated glass is impaired, thereby reducing the effect of ameliorating the deterioration in sound-insulating property caused by, for example, sunlight irradiation.

Examples of the above-mentioned opacifiers include calcium carbonate, alumina, kaolin clay, calcium silicate, magnesium oxide, magnesium hydroxide, aluminum hydroxide, magnesium carbonate, talc, feldspar powder, mica, baryte, bariumcarbonate, titanium oxide, silica, and glass beads. Examples of the heat-ray shielding fine particles include tin-doped indium oxide (ITO), antimony-doped tin oxide (ATO), aluminum-doped zinc oxide (AZO), indium-doped zinc oxide (IZO), tin-doped zinc oxide, silicon-doped zinc oxide, zinc antimonate, lanthanum hexaboride, cerium hexaboride, fine gold powder, fine silver powder, fine platinum powder, and fine aluminum powder. Examples of the light shielding agents include carbon black and red iron oxide. Example of the pigments includes a dark red-brown pigment obtained by mixing four pigments, i.e., a black pigment of carbon black, a red pigment (C.I.Pigment red), a blue pigment (C.I.Pigment blue), and a yellow pigment (C.I.Pigment yellow). They can be used singly or as mixtures of two or more thereof, and from the viewpoint of weatherability, inorganic fine particles are considered preferable.

The average particle size of the inorganic fine particles such as opacifiers, heat-ray shielding fine particles, light shielding agents and pigments is preferably in the range of 1 to 100 μm, more preferably in the range of 1 to 50 μm. Their average particle sizes can be measured by the dynamic light scattering method using a light scattering instrument (e.g., "DLS-6000AL" manufactured by Otsuka Electronics) and an Ar laser as a light source. The inorganic fine particles such as opacifiers, light blocking agents, or pigments are generally used at ratios in the range of 0.3 to 30 parts by weight, preferably in the range of 0.5 to 20 parts by weight, per 100 parts by weight of the polyvinyl acetal resin, so that the opaque polyvinylacetal resin film maybe produced. The heat-ray shielding fine particles are usually used at ratios in the range of 0.001 to 30 parts by weight, preferably in the range of 0.001 to 10 parts by weight, more preferably in the range of 0.005 to 5 parts by weight, per 100 parts by weight of the polyvinyl acetal resin.

Particularly, the opaque polyvinyl acetal resin layer is preferably colored with the inorganic fine particles, so that the colored films may be formed. Preferable are the colored films composed of the above-described opaque polyvinyl acetal resin being colored with fine achromatic (white, light gray, gray, blackish gray, black) inorganic particles, since they can be produced in the subdued color tone.

Meanwhile, the various polyvinyl acetal resin layers as described above can be incorporated with a variety of additives used for this type of interlayers, such as UV absorbers, antioxidants and adhesion regulating agents and the like.

Taking into consideration the minimum levels or magnitudes of penetration resistance and weatherability required of the laminated glass, the interlayer for laminated glass according to the fourth invention preferably shows a total film thickness in the range of 0.3 to 1.6 mm for practical reasons, as is the same with the conventional transparent interlayers for laminated glass.

The above-described sound-insulating polyvinyl acetal resin layer can be produced by kneading the above-described polyvinyl acetal resin and the above-mentioned plasticizer, as well as a variety of the additives to be added, as the case may be, with an extruder, a plastograph, a kneader, a banbury mixer or a calender roll, followed by film-forming into the sheet form by the conventional film forming process such as the extrusion, calendering and press processes.

The above-described opaque polyvinyl acetal resin layer can be produced by kneading the above-described polyvinyl acetal resin, the above-mentioned plasticizer and the above-mentioned opacifiers, as well as inorganic fine particles such as heat-ray shielding fine particles, light shielding agents and various pigments, and if necessary, a variety of the additives to be added, with an extruder, a plastograph, a kneader, a banbury mixer, or a calender roll, followed by film-forming into the sheet form by the conventional film forming process, such as the extrusion, calendering and press processes.

The interlayer for laminated glass of the fourth invention can be produced by stacking the sound-insulating polyvinyl acetal resin layer and the opaque polyvinyl acetal resin layer, which are individually film-formed separately as described above, as well as an opaque or transparent polyvinyl acetal resin layer, as the case may be, followed by heating and pressuring to be integrated into one structural member. The interlayer can also be produced by film-forming into one structural member through multiple-layer extrusion process a film-forming resin composition for the above-mentioned sound-insulting polyvinyl acetal resin layer and a film-forming resin composition for the opaque polyvinyl acetal resin layer, as well as a film-forming resin composition for the opaque polyvinyl acetal resin layer, as the case may be. As an alternative process, the interlayer can be produced concurrently with the production of laminated glass by stacking the sound-insulating polyvinyl acetal rein layer and the opaque polyvinyl acetal resin layer, as well as an opaque or transparent polyvinyl acetal resin layer, as the case may be, between two glass sheets, followed by heating and pressuring to be integrated into one structural member.

The laminated glass of the fourth invention can be produced by the same process as the conventional one for producing laminated glass. For example, the laminated glass is produced by sandwitching the above-described interlayer for laminated glass between at least two transparent glass sheets, then passing them through pressure rolls or placing them in a rubber bag, followed by vacuum suction to give a laminated body through the preliminary bonding of the interlayer to the glass sheets at about 70 to 110° C., while removing air remaining between the glass sheets and the interlayer, and placing the deaerated laminated body in an autoclave or subjecting the same to pressing to carry out the final bonding at about 120 to 150° C. under an applied pressure of about 1 to 1.5 MPa.

Meanwhile, the transparent glass sheets are not particularly limited, and transparent glass sheets generally used can be used. Examples of such transparent glass sheets include various kinds of inorganic glass sheets, such as float plate glass sheets, heat-absorbing glass sheets, polished plate glass sheets, template glass sheets, wire plate glass sheets and line plate glass sheets, and various organic glass plates or sheets such as polycarbonate plates and polymethyl methacrylate plates. These glass sheets may be used singly or in combination of two or more thereof. Among them, heat-absorbing glass sheets are preferably used. The thickness of each glass sheet is not particularly limited and can be appropriately selected depending upon their intended use, but is preferably in the range of 1 to 3 mm.

The haze value of the laminated glass as obtained in the above manner which are included in the first to fourth inventions is preferably not less than 20%, particularly preferably not less than 50%, more preferably not less than 60%. When the haze value of the laminated glass of the present invention is less than 20%, scattering of visible light dimishes, thereby impairing the light shielding property of the laminated glass.

EXAMPLES

The present invention will be described below in more detail with reference to the following Examples of the present invention. It is to be construed that the present invention is not limited to these Examples.

Examples of the First Invention

Example 1-1

(1) Production of Interlayer A-1 for Laminated Glass:

A quantity of 100 parts by weight of anethylene-vinylacetate copolymer resin with a vinyl acetate content of 26 wt % ("Ultrathene 634" manufactured by Tosoh Corp.) as an EVA resin, 6 parts by weight of fine-particle calcium carbonate powder particles (average particle size of 3 Am) as fine-particle inorganic powder, and 0.25 part by weight of fine ITO particles (manufactured by Mitsubishi Materials and having an average particle size of 0.03 μm) as heat-ray shielding fine particles were mixed, and the mixture was sufficiently melt-kneaded with a mixing roll and press-molded at 150° C. for 30 minutes with a press-molding machine to produce an interlayer A-1 for laminated glass having an average thickness of 0.40 mm.

(2) Production of Laminated Glass

The interlayer A-1 for laminated glass was sandwiched between two transparent float glass sheets (30 cm length×30 cm width×2.5 mm thickness), and they were placed in a rubber bag, which was then deaerated under a vacuum of 2.6 kPa for 20 minutes and transferred into an oven at 90° C., while keeping it deaerated, followed by vacuum-pressing at 90° C. for 30 minutes to carry out the preliminary bonding of the laminated body. The preliminarily bonded laminated glass was subjected to pressure-bonding in an air-type autoclave for 20 minutes under the conditions of 135° C. and 1.2 MPa of pressure to produce a laminated glass.

Example 1-2

(1) Production of Interlayer A-2 for Laminated Glass:

An interlayer A-2 for laminated glass having an average thickness of 0.40 mm was produced in the same manner as described in Example 1-1 except that 6 parts by weight of the fine-particle calcium carbonate powder used as fine-particle inorganic powder was replaced with 5 parts by weight of fine-particle silica powder (having an average particle size of 5 μm).

(2) Production of Laminated Glass

A laminated glass was produced in the same manner as described in Example 1-1 except that the interlayer A-1 for laminated glass was replaced with the interlayer A-2 for laminated glass.

Comparative Example 1-1

(1) Production of Interlayer B for Laminated Glass

A transparent interlayer B for laminated glass having an average thickness of 0.40 mm was produced in the same manner as described in Example 1-1 except that the heat-ray shielding fine particles and the fine-particle inorganic powder were not contained.

(2) Production of Laminated glass

A laminated glass was produced in the same manner as described in Example 1-1 except that the interlayer A-1 for laminated glass was replaced with the interlayer B for laminated glass.

(Evaluation)

For the laminated glasses produced individually in Examples 1-1 and 1-2 and Comparative Example 1-1, a haze value, a visible light transmittance (Tv), a solar transmittance (Te), and a solar reflectance (Re) were measured using the following methods.

Further, the laminated glasses of Examples were visually inspected for agglomeration or poor dispersion of the fine-particle inorganic powder (especially, an opacifier), uneven coloration of the laminated glass, and formation of fine air bubbles at the interface between each glass sheet and the interlayer.

The evaluation results are shown in Table 1.

(1) Measurement of Haze Value

A haze value in the rays of light at the wavelength of 340 to 1800 nm was measured with an integral turbidimeter (manufactured by Tokyo Denshoku) in accordance with JIS K 6714 "Methacryl Resin Plate for Aircraft".

(2) Measurement of Visible Light Transmittance (Tv), Solar Transmittance (Te), and Solar Reflectance (Re)

A visible light transmittance (Tv) at the wavelength of 380 to 780 nm, a solar transmittance (Te) at the wavelength of 300 to 2100 nm, and a solar reflectance (Re) at the wavelength of 300 to 2100 nm were measured with a direct-recording spectrophotometer (manufactured by Shimadzu Corp. under the trade name of "UV-3100") in accordance with JIS Z 8722 and JIS R 3106.

TABLE 1

| | | Example 1-1 | Example 1-2 | Comparative Example 1-1 |
|---|---|---|---|---|
| Interlayer for laminated glass | | A-1 | A-2 | B |
| | EVA resin | 100 | 100 | 100 |
| | Calcium carbonate | 6 | — | — |
| | Silica | — | 5 | — |
| | ITO fine particles | 0.25 | 0.25 | — |
| | Thickness (mm) | 0.40 | 0.40 | 0.40 |
| Haze value of laminated glass (%) | | 91.0 | 51 | 0.5 |
| Visible light transmittance (Tv) | | 61 | 69 | 49 |
| Solar transmittance (Te) | | 49 | 59 | 79 |
| Solar reflectance (Re) | | 10 | 7 | 7 |
| Evenness of coloring | | Good | Good | — |
| Fine air bubbles | | None | None | — |

Examples of the Second Invention

Example 2-1

(1) Production of Polyvinyl Butyral Resin (a) and Interlayer A-1 for Laminated Glass A quantity of 191 parts by weight of a polyvinyl alcohol having an average degree of polymerization of 1700 and a degree of saponification of 88.1 mol % was added to 2890 parts by weight of pure water, followed by heating for dissolution. The reaction system, after its temperature was adjusted to 12° C., was admixed with 201 parts by weight of a 35 wt % hydrochloric acid catalyst and 148 parts by weight of n-butyraldehyde, and was maintained at this temperature to allow the reaction product to precipitate. The reaction system was maintained at 45° C. for 3 hours to complete the reaction, then washed with excessive water to wash out unreacted n-butyraldehyde, treated with an aqueous sodium hydroxide solution to neutralize the hydrochloric acid catalyst, washed with excessive water and dried to give a polyvinyl butyral resin in the form of white powder (a). The resin (a) was found to show an average degree of butyralization of 63.8 mol % and a vinyl acetate content of 11.9 mol %.

A quantity of 100 parts by weight of the above-mentioned resin (a), 51 parts by weight of triethylene glycol di-2-ethylbutyrate (3GH) as a plasticizer, 5 parts by weight of silica powder having an average particle size of 5 μm as fine-particle inorganic powder, 0.1 part by weight of 2-(2'-hydroxy-5'-methylphenyl)benzotriazole as a UV absorber, and 0.1 part by weight of t-butyl hydroxytoluene as an antioxidant were mixed, and the mixture was sufficiently melt-kneaded with a mixing roll and press-molded with a press-molding machine at 150° C. for 30 minutes to produce an interlayer A-1 for laminated glass having an average thickness of 0.9 mm.

(2) Production of Laminated Glass

The interlayer A-1 for laminated glass was sandwiched between two transparent float glass sheets (30 cm long×30 cm wide×2.5 mm thick), and then they were placed in a rubber bag, which was deaerated under a vacuum of 2.6 kPa for 20 minutes, and transferred into an oven at 90° C., while keeping it deaerated, followed by vacuum-pressing at 90° C. for 30 minutes to carry out the preliminary bonding of the laminated body. The preliminarily bonded laminated glass was subjected to pressure-bonding in an air-type autoclave for 20 minutes under the conditions of 135° C. of temperature and 1.2 MPa of pressure to produce a laminated glass.

Example 2-2

(1) Production of Polyvinyl Butyral Resin (b) and Interlayer B-1 for Laminated Glass A quantity of 191 parts by weight of a polyvinyl alcohol having an average degree of polymerization of 1700 and a degree of saponification of 98.5 molt was added to 2890 parts by weight of pure water, followed by heating for dissolution, and the reaction system, after its temperature was adjusted to 12° C., then admixed with 201 parts by weight of a 35 wt % hydrochloric acid catalyst and 165 parts by weight of n-butyraldehyde, and maintained at this temperature to allow the reaction product to precipitate. The reaction system was further maintained at 45° C. for 3 hours to complete the reaction, washed with excessive water to wash out unreacted n-butyraldehyde, treated with an aqueous sodium hydroxide solution to neutralize the hydrochloric acid catalyst, washed with excessive water for 2 hours, and dried to give a polyvinyl butyral resin (b) in the form of white powder. The resin (b) was found to show an average degree of butyralization of 71.0 mol % and a vinyl acetate content of 1.5 mol %.

A quantity of 100 parts by weight of the resin (b), 51 parts by weight of triethylene glycol di-2-ethylbutyrate (3GH) as a plasticizer, 0.1 part by weight of 2-(2'-hydroxy-5'-methylphenyl)benzotriazole as a UV absorber, 0.1 part by weight of t-butyl hydroxytoluene as an antioxidant, and 6.5 parts by weight of calcium carbonate having an average particle size of 3 μm as fine-particle inorganic powder were mixed, and the mixture was sufficiently melt-kneaded with a mixing roll and press-molded with a press-molding machine at 150° C. for 30 minutes to produce an interlayer B-1 for laminated glass having an average thickness of 0.90 mm.

(2) Production of Laminated Glass

A laminated glass was produced in the same manner as described in Example 2-1 except that the interlayer A-1 for laminated glass was replaced with the interlayer B-1 for laminated glass.

Comparative Example 2-1

Production of Interlayer B-2 for Laminated Glass 100 parts by weight of the resin (b), 51 parts by weight of triethylene glycol di-2-ethylbutyrate (3GH) as a plasticizer, 0.1 part by weight of 2-(2'-hydroxy-5'-methylphenyl)benzotriazole as a UV absorber, and 0.1 part by weight of t-butyl hydroxytoluene as an antioxidant were mixed, and the mixture was then sufficiently melt-kneaded with a mixing roll and press-molded with a press-molding machine at 150° C. for 30 minutes to produce a transparent interlayer B-2 for laminated glass having an average thickness of 0.90 mm, which did not contain any fine-particle inorganic powder. Using the above-mentioned interlayer B-2, laminated glass was produced in the same manner as described in Example 2-1 having an average thickness of 0.90 mm.

Example 2-3

(1) Production of Interlayer for Laminated glass A-2

A quantity of 100 parts by weight of the resin (a) obtained in Example 2-1, 51 parts by weight of triethylene glycol di-2-ethylbutyrate (3GH) as a plasticizer, 0.5 part by weight of fine ITO particles (manufactured by Mitsubishi Materials Co.) as heat-ray shielding fine particles, 5 parts by weight of silica powder having an average particle size of 5 μm as fine-particle inorganic powder, 0.1 part by weight of 2-(2'-hydroxy-5'-methylphenyl)-benzotriazole as a UV absorber, and 0.1 part by weight of t-butylhydroxytoluene as an antioxidant were mixed, and the mixture was sufficiently melt-kneaded with a mixing roll and press-molded with a press-molding machine at 150° C. for 30 minutes to produce an interlayer A-2 for laminated glass having an average thickness of 0.9 mm.

(2) Production of Laminated Glass

A laminated glass was produced in the same manner as described in Example 2-1 except that the interlayer A-1 for laminated glass was replaced with the interlayer A-2 for laminated glass.

Example 2-4

(1) Production of Interlayer B-3 for Laminated Glass

A quantity of 100 parts by weight of the resin (b) produced in Example 2-2, 51 parts by weight of triethylene glycol di-2-ethylbutyrate (3GH) as a plasticizer, 1 part by weight of fine ITO particles (manufactured by Mitsubishi Materials Co.) as heat-ray shielding fine particles, 0.1 part by weight of 2-(2'-hydroxy-5'-methylphenyl)-benzotriazole as a UV absorber, 0.1 part by weight of t-butyl-hydroxytoluene as an antioxidant, and 6.5 parts by weight of calcium carbonate having an average particle size of 3 μm as fine-particle inorganic powder were mixed, and the mixture was sufficiently melt-kneaded with a mixing roll and press-molded with a press-molding machine at 150° C. for 30 minutes to produce an interlayer B-3 for laminated glass having an average thickness of 0.90 mm.

(2) Production of Laminated glass

A laminated glass was produced in the same manner as described in Example 2-2 except that the interlayer B-1 for laminated glass was replaced with the interlayer B-3 for laminated glass.

(Evaluation)

For the laminated glasses produced individually in Examples 2-1 and 2-2 and Comparative Example 2-1, a haze value and a loss factor were measured using the following methods. For the interlayers for laminated glass produced individually in Examples 2-1 and 2-2 and Comparative Example 2-1, self-adhesive strength was measured using the following method. The evaluation results are shown in Table 2.

Further, for the laminated glasses produced individually in Examples 2-3 and 2-4, a haze value, a loss factor and a self-adhesive strength were measured, while a visible light transmittance (Tv), a solar transmittance (Te), and a solar reflectance (Re) were measured using the following methods. The evaluation results are shown in Table 3.

(1) Measurement of Haze Value

A haze value in the rays of light at the wavelength of 340 to 1800 nm was measured with an integrating turbidimeter (manufactured by Tokyo Denshoku Co.) in accordance with JIS K 6714 "Methacryl Resin Plate for Aircrafts".

(2) Measurement of Loss Factor

A sample (25 mm wide×300 mm long) was cut from the laminated glass, and subjected to vibration by use of a vibration generator for damping test ("G21-005D" manufactured by Shinken Co.) in a thermostat-controlled bath at 20° C., and the resulting vibration characteristics were amplified by a mechanical impedance amplifier ("XG-81" manufactured by RION Co.), whereby the vibrational spectra were analyzed by an FFT spectrum analyzer ("FFT Spectrum Analyzer HP 3582A" manufactured by Yokogawa Hewlett Packard Co.) to determine a loss factor from a peak in the frequency range from 2,000 to 3,000 Hz. A higher loss factor means a higher level of sound-insulating property.

(3) Measurement of Self-Adhesive Strength

Two samples (10 mm wide×100 mm long) were cut from the interlayer for laminated glass under the conditions of 23° C. and 50% RH, and after they were positioned to overlap each other, a roller weighing 2 kg was rolled back and forth twice over the overlapped pieces in their lengthwise direction to make pressure-bonding. After a double sided tape was bonded to one side of the resultant test sample, it was fixed to a fixation plate made of SUS via the double sided tape and subjected to a 1800 peeling test at a peeling rate of 500 mm/min to thereby determine a peeling strength.

(4) Measurement of Visible Light Transmittance (Tv), Solar Transmittance (Te), and Solar Reflectance (Re)

A visible light transmittance (Tv) at the wavelength of 380 to 780 nm, a solar transmittance (Te) at the wavelength of 300 to 2100 nm, and a solar reflectance (Re) at the wavelength of 300 to 2100 nm were measured with a direct-recording spectrophotometer ("UV-3100" manufactured by Shimadzu Corp.) in accordance with JIS Z 8722 and JIS R 3106.

TABLE 2

| | | Example 2-1 | Example 2-2 | Comparative Example 2-1 |
|---|---|---|---|---|
| Interlayer for laminated glass | | A-1 | B-1 | B-2 |
| | Resin (a) | 100 | — | — |
| | Resin (b) | — | 100 | 100 |
| | 3 GH | 51 | 51 | 51 |
| | UV absorber | 0.1 | 0.1 | 0.1 |
| | Antioxidant | 0.1 | 0.1 | 0.1 |
| | Silica | 5 | — | — |
| | Calcium carbonate | — | 6.5 | — |
| | Thickness (mm) | 0.9 | 0.9 | 0.9 |

TABLE 2-continued

|  | Example 2-1 | Example 2-2 | Comparative Example 2-1 |
|---|---|---|---|
| Haze value of laminated glass (%) | 50 | 87 | 0.4 |
| Loss factor | 0.27 | 0.29 | 0.26 |
| Self-adhesive strength of interlayer for laminated glass (N/cm) | 1.9 | 1.6 | 7 |

As can be seen from Table 2, the laminated glass produced with the interlayer for laminated glass of Example 2-1 or 2-2 containing inorganic powder such as silica powder or calcium carbonate powder has a higher loss factor than the laminated glass produced with the interlayer for laminated glass of Comparative Example 2-1 containing no inorganic powder. These results indicate that the laminated glasses of Examples 2-1 and 2-2 offer highly sound-insulating property.

Further, the interlayer for laminated glass containing inorganic powder such as silica powder or calcium carbonate powder has a lowered self-adhesive strength among the interlayer-films so that blocking is less likely to occur during storage or handling.

TABLE 3

|  |  | Example 2-3 | Example 2-4 |
|---|---|---|---|
| Interlayer for laminated glass | | A-2 | B-3 |
| | Resin (a) | 100 | — |
| | Resin (b) | — | 100 |
| | 3GH | 51 | 51 |
| | ITO | 0.5 | 1 |
| | UV absorber | 0.1 | 0.1 |
| | Antioxidant | 0.1 | 0.1 |
| | Silica | 5 | — |
| | Calcium carbonate | — | 6.5 |
| | Thickness (mm) | 0.9 | 0.9 |
| Haze value of laminated glass = (%) | | 55 | 93 |
| Loss factor | | 0.28 | 0.27 |
| Self-adhesive strength of interlayer for laminated glass = (N/cm) | | 1.8 | 1.6 |
| Visible light transmittance (Tv) | | 67 | 58 |
| Solar transmittance (Te) | | 54 | 44 |
| Solar Reflectance (Re) | | 8 | 11 |

Examples of the Third Invention

Example 3-1

(1) Production of Polyvinyl Butyral Resin (a) and Resin Layer A-1

A quantity of 191 parts by weight of a polyvinyl alcohol having an average degree of polymerization of 1700 and a degree of saponification of 88.1 mol % was added to 2890 parts by weight of pure water, followed by heating for dissolution. The reaction system, after its temperature was adjusted to 12° C., was admixed with 201 parts by weight of a 35 wt % hydrochloric acid catalyst and 148 parts by weight of n-butyraldehyde and maintained at this temperature to allow the reaction product to precipitate. Then, the reaction system was maintained at 45° C. for 3 hours to complete the reaction, washed with excessive water to wash out unreacted n-butyraldehyde, treated with an aqueous sodium hydroxide solution to neutralize the hydrochloric acid catalyst, washed again with excessive water for 2 hours, and dried to give a polyvinyl butyral resin (a) in the form of white powder. The resin (a) was found to show an average degree of butyralization of 63.8 mol % and a vinyl acetate content of 11.9 mol %.

A quantity of 100 parts by weight of the resin (a), 55 parts by weight of triethylene glycol di-2-ethylbutyrate (3GH) as a plasticizer, 8 parts by weight of silica powder having an average particle size of 5 μm as fine-particle inorganic powder, 0.1 part by weight of 2-(2'-hydroxy-5'-methylphenyl)-benzotriazole as a UV absorber, and 0.1 part by weight of t-butyl hydroxytoluene as an antioxidant were mixed, and the mixture was sufficiently melt-kneaded with a mixing roll and press-molded with a press-molding machine at 150° C. for 30 minutes to produce a resin layer A-1 having an average thickness of 0.2 mm.

(2) Production of Polyvinyl Butyral Resin (b) and Resin Layer B

A quantity of 191 parts by weight of a polyvinyl alcohol having an average degree of polymerization of 1700 and a degree of saponification of 98.9 mol % was added to 2890 parts by weight of pure water, followed by heating for dissolution. The reaction system, after its temperature was adjusted to 12° C., was admixed with 201 parts by weight of a 35 wt % hydrochloric acid catalyst and 152 parts by weight of n-butyraldehyde, maintained at this temperature to allow the reaction product to precipitate, then maintained at 45° C. for 3 hours to complete the reaction, washed with excessive water to wash out unreacted n-butyraldehyde, treated with an aqueous sodium hydroxide solution to neutralize the hydrochloric acid catalyst, washed again with excessive water for 2 hours, and dried to give a polyvinyl butyral resin (b) in the form of white powder. The resin (b) was found to have an average degree of butyralization of 68.0 molt and a vinyl acetate content of 1.1 mol %.

A quantity of 100 parts by weight of the resin (b), 40 parts by weight of triethylene glycol di-2-ethylbutyrate (3GH) as a plasticizer, 0.1 part by weight of 2-(2'-hydroxy-5'-methylphenyl)benzotriazole as a UV absorber, and 0.1 part by weight of t-butyl hydroxytoluene as an antioxidant were mixed, and the mixture was then sufficiently melt-kneaded with a mixing roll and press-molded at 150° C. for 30 minutes with a press-molding machine to produce a resin layer B having an average thickness of 0.3 mm.

(3) Production of Interlayer for Laminated Glass and Laminated Glass

The resin layers A-1 and B as used were stacked in the order of resin layer B/resin layer A-1/resin layer B, and the stacked resin layers were sandwiched between two transparent float glass sheets (30 cm long×30 cm wide×2.5 cm thick). The stacked assembly of the resin layers and glass sheets was placed in a rubber bag, which was deaerated for 20 minutes under vacuum of 2.6 kPa, transferred in an oven at 90° C., while keeping it deaerated, and vacuum-pressed while maintaining it at 90° C. for 30 minutes. The thus preliminarily bonded laminated glass was subjected to pressure-bonding in an air-type oven for 20 minutes under the conditions of 135° C. and 1.2 MPa of pressure to thereby carry out the concurrent production of the interlayer and the laminate glass sheet; namely, the interlayer for laminated glass and the laminated glass were produced concurrently.

Example 3-2

(1) Production of Resin Layer A-2

A quantity of 100 parts by weight of the resin (a), 55 parts by weight of triethylene glycol di-2-ethylbutyrate (3GH) as a plasticizer, 0.1 part by weight of 2-(2'-hydroxy-5'-methylphenyl)benzotriazole as a UV absorber, 0.1 part by weight of t-butyl hydroxytoluene as an antioxidant, and 10 parts by weight of calcium carbonate having an average particle size of 3 μm as fine-particle inorganic powder were mixed, and the mixture was sufficiently melt-kneaded with a mixing roll and press-molded at 150° C. for 30 minutes with a press-molding machine to produce a resin layer A-2 having an average thickness of 0.20 mm.

(2) Production of Interlayer for Laminated Glass and Laminated Glass

An interlayer for laminated glass and laminated glass were produced concurrently in the same manner as described in Example 3-1 except that the resin layers A-1 and B were used as stacked in the order of resin layer B/resin layer A-2/resin layer B.

Comparative Example 3-1

(1) Production of Resin Layer A-3

A quantity of 100 parts by weight of the resin (a), 55 parts by weight of triethylene glycol di-2-ethylbutyrate (3GH) as a plasticizer, 0.1 part by weight of 2-(2'-hydroxy-5'-methylphenyl)benzotriazole as a UV absorber, and 0.1 part by weight of t-butyl hydroxytoluene as an antioxidant were mixed, and the mixture was sufficiently melt-kneaded with a mixing roll and press-molded at 150° C. for 30 minutes with a press-molding machine to produce a transparent resin layer A-3 having an average thickness of 0.20 mm, which did not contain fine-particle inorganic powder.

An interlayer and laminated glass were produced concurrently in the same manner as described in Example 3-1 except that the resin layers A-3 and B were used as stacked in the order of resin layer B/resin layer A-3/resin layer B.

Example 3-3

(1) Production of Resin Layer A-4

A quantity of 100 parts by weight of the resin (a), 60 parts by weight of triethylene glycol di-2-ethylbutyrate (3GH) as a plasticizer, 3 parts by weight of fine ITO particles (manufactured by Mitsubishi Materials) as heat-ray shielding fine particles, 8 parts by weight of silica powder having an average particle size of 5 μm as fine-particle inorganic powder, 0.1 part by weight of 2-(2'-hydroxy-5'-methylphenyl)benzotriazole as a UV absorber, and 0.1 part by weight of t-butyl hydroxytoluene as an antioxidant were mixed, and the mixture was sufficiently melt-kneaded with a mixing Rolland, press-molded with a press-molding machine at 150° C. for 30 minutes to produce a resin layer A-4 having an average thickness of 0.2 mm.

(2) Production of Interlayer for Laminated Glass and Laminated Glass

An interlayer for laminated glass and laminated glass were produced in the same manner as described in Example 3-1 except that the resin layer A-1 was replaced with the resin layer A-4.

Example 3-4

(1) Production of Resin Layer B'

A quantity of 100 parts by weight of the resin (b) produced in Example 3-1, 40 parts by weight of triethylene glycol di-2-ethylbutyrate (3GH) as a plasticizer, 1 part by weight of fine ITO particles (manufactured by Mitsubishi Materials) as heat-ray shielding fine particles, 0.1 part by weight of 2-(2'-hydroxy-5'-methylphenyl)- benzotriazole as a UV absorber and 0.1 part by weight of t-butyl hydroxytoluene as an antioxidant were mixed, and the mixture was sufficiently melt-kneaded with a mixing roll and press-molded with a press-molding machine at 150° C. for 30 minutes to produce a resin layer B' having an average thickness of 0.3 mm.

(2) Production of Interlayer for Laminated Glass and Laminated Glass

An interlayer for laminated glass and a laminated glass were produced in the same manner as described in Example 3-1 except that the resin layer B was replaced with the resin layer B'.

Example 3-5

(1) Production of Resin Layer A-5

A quantity of 100 parts by weight of the resin (a) produced in Example 3-1, 60 parts by weight of triethylene glycol di-2-ethylbutyrate (3GH) as a plasticizer, 5 parts by weight of fine ITO particles (manufactured by Mitsubishi Materials Co.) as heat-ray shielding fine particles, 0.1 part by weight of 2-(2'-hydroxy-5'-methylphenyl)benzotriazole as a UV absorber, 0.1 part by weight of t-butyl-hydroxytoluene as an antioxidant, and 10 parts by weight of calcium carbonate powder having an average particle size of 3 μm as fine-particle inorganic powder were mixed, and the mixture was sufficiently melt-kneaded with a mixing roll and, press-molded with a press-molding machine at 150° C. for 30 minutes to produce a resin layer A-5 having an average thickness of 0.20 mm.

(2) Production of Interlayer for Laminated Glass and Laminated Glass

An interlayer for laminated glass and a laminated glass were produced in the same manner as described in Example 3-2 except that the resin layer A-2 was replaced with the resin layer A-5.

Example 3-6

An interlayer for laminated glass and a laminated glass were produced in the same manner as described in Example 3-2 except that the resin layer B was replaced with the resin layer B' obtained in Example 3-4.

(Evaluation)

For the laminated glasses produced individually in Examples 3-1 and 3-2 and Comparative Example 3-1, a haze value and a loss factor were measured using the following methods. The evaluation results are shown in Table 4.

For the laminated glasses produced individually in Examples 3-3 to 3-6, a haze value, a loss factor, a visible light transmittance (Tv), a solar transmittance (Te), and a solar reflectance (Re) were measured using the following methods. The evaluation results are shown in Table 5.

(1) Measurement of Haze Value

A haze value against the rays of light at the wavelengths of 340 to 1800 nm was measured with an integrating turbidimeter (manufactured by Tokyo Denshoku) in accordance with JIS K 6714 "Methacryl Resin Plate for Aircrafts".

(2) Measurement of Loss Factor

A sample (25 mm wide×300 mm long) was cut from the laminated glass, and subjected to vibration by the use of a vibration generator for damping tests ("G21-005D" manufactured by Shinken Co., Ltd.) in a thermostat-controlled bath at 20° C. The resulting vibration characteristics were amplified by a mechanical impedance amplifier ("XG-81" manufactured by RION Co., Ltd.) and the vibration spectra were analyzed by an FFT spectrum analyzer ("FFT spectrum analyzer HP 3582A" manufactured by Yokogawa Hewlett Packard Co.) to determine a loss factor from a peak in the frequency range from 2,000 to 3,000 Hz. A higher loss factor means a higher level of sound-insulating property.

(3) Measurement of Visible Light Transmittance (Tv), Solar Transmittance (Te), and Solar Reflectance (Re)

A visible light transmittance (Tv) at the wavelengths of 380 to 780 nm, a solar transmittance (Te) at the wavelengths of 300 to 2100 nm, and a solar reflectance (Re) at the wavelengths of 300 to 2100 nm were measured with a direct-recording spectrophotometer ("UV-3100" manufactured by Shimadzu Corp.) in accordance with JIS Z 8722 and JIS R 3106.

TABLE 4

|  |  | Example 3-1 | Example 3-2 | Comparative Example 3-1 |
|---|---|---|---|---|
| Sound-insulating resin layer A |  | A-1 | A-2 | A-3 |
|  | Resin (a) | 100 | 100 | 100 |
|  | 3 GH | 55 | 55 | 55 |
|  | UV absorber | 0.1 | 0.1 | 0.1 |
|  | Antioxidant | 0.1 | 0.1 | 0.1 |
|  | Silica | 8 | — | — |
|  | Calcium carbonate | — | 10 | — |
|  | Thickness (mm) | 0.2 | 0.2 | 0.2 |
| Transparent resin layer B |  | B | B | B |
|  | Resin (b) | 100 | 100 | 100 |
|  | 3 GH | 40 | 40 | 40 |
|  | UV absorber | 0.1 | 0.1 | 0.1 |
|  | Antioxidant | 0.1 | 0.1 | 0.1 |
|  | Thickness (mm) | 0.3 | 0.3 | 0.3 |
| Laminate construction |  | B/A/B | B/A/B | B/A/B |
| Thickness of interlayer (mm) |  | 0.8 | 0.8 | 0.8 |
| Haze value of laminated glass(%) |  | 51 | 88 | 0.4 |
| Loss factor |  | 0.42 | 0.43 | 0.38 |

As can be seen from Table 4, the interlayers for laminated glass of Examples 3-1 and 3-2 which comprises a laminate of the opaque and sound-insulating polyvinyl acetal resin layer (A) containing silica powder or calcium carbonate powder as fine-particle inorganic powder with the transparent polyvinyl acetal resin layer (B) were found to provide the laminated glass with a higher loss factor than the interlayer for laminated glass of Comparative Example 3-1 which comprises a laminate of the resin layers not being incorporated with inorganic powder. Namely, such interlayers were shown to provide a laminated glass with highly sound-insulating property.

TABLE 5

|  |  | Example 3-3 | Example 3-4 | Example 3-5 | Example 3-6 |
|---|---|---|---|---|---|
| Sound-insulating resin layer A |  | A-4 | A-1 | A-5 | A-2 |
|  | Resin (a) | 100 | 100 | 100 | 100 |
|  | 3GH | 60 | 55 | 60 | 55 |
|  | ITO | 3 | — | 5 | — |
|  | UV absorber | 0.1 | 0.1 | 0.1 | 0.1 |
|  | Antioxidant | 0.1 | 0.1 | 0.1 | 0.1 |
|  | Silica | 8 | 8 | — | — |
|  | Calcium carbonate | — | — | 10 | 10 |
|  | Thickness (mm) | 0.2 | 0.2 | 0.2 | 0.2 |
| Transparent resin layer B (B') |  | B | B' | B | B' |
|  | Resin (b) | 100 | 100 | 100 | 100 |
|  | 3GH | 40 | 40 | 40 | 40 |
|  | ITO | — | 1 | — | 1 |
|  | UV absorber | 0.1 | 0.1 | 0.1 | 0.1 |
|  | Antioxidant | 0.1 | 0.1 | 0.1 | 0.1 |
|  | Thickness (mm) | 0.3 | 0.3 | 0.3 | 0.3 |
| Laminate construction |  | B/A/B | B'/A/B' | B/A/B | B'/A/B' |

TABLE 5-continued

|  | Example 3-3 | Example 3-4 | Example 3-5 | Example 3-6 |
|---|---|---|---|---|
| Thickness of interlayer (mm) | 0.8 | 0.8 | 0.8 | 0.8 |
| Haze value (%) | 50 | 52 | 87 | 88 |
| Loss factor | 0.44 | 0.41 | 0.45 | 0.43 |
| Visible light transmittance (Tv) | 68 | 67 | 61 | 62 |
| Solar transmittance (Te) | 56 | 54 | 46 | 47 |
| Solar reflectance (Re) | 9 | 8 | 10 | 10 |

Examples of Fourth Invention

Example 4-1

(1) Production of Polyvinyl Butyral Resin (a) and Resin Layer A-1

A quantity of 191 parts by weight of a polyvinyl alcohol having an average degree of polymerization of 1700 and a degree of saponification of 88.1 mol % were added to 2890 parts by weight of pure water, followed by heating for dissolution. The reaction system, after its temperature was adjusted to 12° C., was admixed with 201 parts by weight of a 35 wt % hydrochloric acid catalyst and 148 parts by weight of n-butyraldehyde, maintained at this temperature to allow the reaction product to precipitate, then maintained at 45° C. for 3 hours to complete the reaction, washed with excessive water to wash out unreacted n-butyraldehyde, treated with an aqueous sodium hydroxide solution to neutralize the hydrochloric acid catalyst, washed with excessive water for 2 hours, and dried to give a polyvinyl butyral resin (a) in the form of white powder. The resin (a) had an average degree of butyralization of 63.8 mol % and a vinyl acetate content of 11.9 mol %.

A quantity of 100 parts by weight of the resin (a), 55 parts by weight of triethylene glycol di-2-ethylbutyrate (3GH) as a plasticizer, 0.1 part by weight of 2-(2'-hydroxy-5'-methylphenyl)benzotriazole ("TINUVIN P", manufactured by CIBA-GEIGY) as a UV absorber, and 0.1 part by weight of t-butyl hydroxytoluene ("Sumilizer BHT" manufactured by Sumitomo Chemical Co.) as an antioxidant were mixed, and the mixture was sufficiently melt-kneaded with a mixing roll and press-molded with a press-molding machine at 150° C. for 30 minutes to produce a resin layer A-1 having an average thickness of 0.15 mm.

(2) Production of Polyvinyl Butyral Resin (b) and Resin Layer B-1

A quantity of 191 parts by weight of a polyvinyl alcohol having an average degree of polymerization of 1700 and a degree of saponification of 98.9 mol % was added to 2890 parts by weight of pure water, followed by heating for dissolution. The reaction system, after its temperature was adjusted to 12° C., was admixed with a 35 wt % hydrochloric acid catalyst and 152 parts by weight of n-butyraldehyde, maintained at this temperature to allow the reaction product to precipitate, then maintained at 45° C. for 3 hours to complete the reaction, washed with excessive water to wash out unreacted n-butyraldehyde, treated with an aqueous sodium hydroxide solution to neutralize the hydrochloric acid catalyst, washed again with excessive water for 2 hours, and dried to give a polyvinyl butyral resin (b) in the form of white powder. The resin (b) was found to have an average degree of butyralization of 68.0 mol % and a vinyl acetate content of 1.1 mol %.

A quantity of 100 parts by weight of the resin (b), 35 parts by weight of triethylene glycol di-2-ethylbutyrate (3GH) as a plasticizer, 0.1 part by weight of 2-(2'-hydroxy-5'-methylphenyl)benzotriazole ("TINUVIN P" manufactured by CIBA-GEIGY Co.) as a UV absorber, 0.1 part by weight of t-butyl hydroxytoluene ("Sumilizer BHT" manufactured by Sumitomo Chemical Co.) as an antioxidant, and 4.0 parts by weight of silica powder having an average particle size of 5 μm as inorganic fine particles were mixed, and the mixture was sufficiently melt-kneaded with a mixing roll and press-molded with a press-molding machine at 150° C. for 30 minutes to produce a resin layer B-1 having an average thickness of 0.20 mm.

(3) Production of Resin Layer C

A 100 parts by weight quantity of the white powder of a polyvinyl butyral resin (b) produced under the above item (2), 40 parts by weight of triethylene glycoldi-2-ethylbutyrate (3GH) as a plasticizer, 0.1 part by weight of 2-(2'-hydroxy-5'-methylphenyl)benzotriazole ("TINUVIN P" manufactured by CIBA-GEIGY Co.) as a UV absorber, and 0.1 part by weight of t-butyl hydroxytoluene ("Sumilizer BHT" manufactured by Sumitomo Chemical Co.) as an antioxidant were mixed, and the mixture was sufficiently melt-kneaded with a mixing roll and press-molded with a press-molding machine at 150° C. for 30 minutes to produce a resin layer C having an average thickness of 0.30 mm.

(4) Production of Interlayer for Laminated Glass and Laminated Glass

The above-described resin layers A-1, B-1, and C as used were stacked in the order of resin layer B-1/resin layer A-1/resin layer C, and sandwiched between two transparent float glass sheets (30 cm long×30 cm wide×2.5 mm thick), and the sandwiched body was then placed in a rubber bag, followed by deaeration under a vacuum of 2.6 kPa for 20 minutes. The rubber bag was transferred in an oven at 90° C., while being kept deaerated, and vacuum-pressed while being furthermore maintained at 90° C. for 30 minutes, and the thus preliminarily bonded laminated glass was subjected to pressure-bonding in an air-type oven for 20 minutes under the conditions of 135° C. and 1.2 MPa of pressure to thereby carry out the concurrent production of an interlayer and a laminated glass; namely, an interlay for laminated glass and a laminated glass were produced concurrently.

Example 4-2

(1) Production of Resin Layer B-2

A quantity of 100 parts by weight of the resin (b), 40 parts by weight of triethylene glycol di-2-ethylbutyrate (3GH) as a plasticizer, 0.1 part by weight of 2-(2'-hydroxy-5'-methylphenyl)benzotriazole ("TINUVIN P" manufactured by CIBA-GEIGY Co.) as a UV absorber, 0.1 part by weight of t-butyl hydroxytoluene ("Sumilizer BHT" manufactured by Sumitomo Chemical Co.) as an antioxidant, and 7.5 parts by weight of calcium carbonate particles having an average particle size of 3 μm as inorganic fine particles were mixed, and the mixture was sufficiently melt-kneaded with a mixing roll and press-molded with a press-molding machine at 150° C. for 30 minutes to produce a resin layer B-2 having an average thickness of 0.30 mm.

(2) Production of Interlayer for Laminated Glass and Laminated Glass

An interlayer and a laminated glass were produced concurrently in the same manner as described in Example 4-1 except that the above-described resin layers A-1 and B-2 were used as stacked in the order of resin layer B-2/resin layer A-1/resin layer B-2.

Example 4-3

(1) Production of Resin Layer B-3

A resin layer B-3 having an average thickness of 0.15 mm was produced in the same manner as described in Example 4-2 except that 7.5 parts by weight of calcium carbonate powder having an average particle size of 3 μm used as inorganic fine particles was replaced with 5.0 parts by weight of a dark red-brown pigment obtained by mixing equal amounts of four pigments, namely carbon black, C.I.Pigment red 207, C.I.Pigment blue 151 and C.I.Pigment yellow 110.

(2) Production of Interlayer for Laminated Glass and Laminated Glass

An interlayer and a laminated glass were produced concurrently in the same manner as described in Example 4-1 except that the above-described resin layers A-1, B-1 and C were used as stacked in the order of resin layer B-3/resin layer C/resin layer A-1/resin layer C.

Example 4-4

(1) Production of Resin Film A-2

A quantity of 100 parts by weight of the resin (a), 55 parts by weight of triethylene glycol di-2-ethylbutyrate (3GH) as a plasticizer, 0.1 part by weight of 2-(2'-hydroxy-5'-methylphenyl)benzotriazole ("TINUVIN P" manufactured by CIBA-GEIGY Co.) as a UV absorber, 0.1 part by weight of t-butyl hydroxytoluene ("Sumilizer BHT" manufactured by Sumitomo Chemical Co.) as an antioxidant, and 8.3 parts by weight of calcium carbonate powder having an average particle size of 3 μm as inorganic fine particles were mixed, and the mixture was then sufficiently melt-kneaded with a mixing roll and press-molded with a press-molding machine at 150° C. for 30 minutes to produce an opaque and sound-insulating resin layer A-2 having an average thickness of 0.15 mm.

(2) Production of Interlayer for Laminated Glass and Laminated Glass

An interlayer and a laminated glass were produced concurrently in the same manner as described in Example 4-1 except that the above-described resin layers A-2 and B-2 were used as stacked in the order of resin layer B-2/resin layer A-2/resin layer B-2.

Comparative Example 4-1

An interlayer and a laminated glass were produced concurrently in the same manner as described in Example 4-1 except that the above-described resin layers A-1 and C were used as stacked in the order of resin C/resin A-1/resin layer C.

Example 4-5

(1) Production of Resin Layer A-3

A quantity of 100 parts by weight of the resin (a) obtained in Example 4-1, 60 parts by weight of triethylene glycol di-2-ethylbutyrate (3GH) as a plasticizer, 2.5 parts by weight of fine ITO particles (manufactured by Mitsubishi Materials Co.) as heat-ray shielding fine particles, 0.1 part by weight of 2-(2'-hydroxy-5'-methylphenyl)benzotriazole ("TINUVIN P" manufactured by CIBA-GEIGY Co.) as a UV absorber, and 0.1 part by weight of t-butyl hydroxytoluene ("Sumilizer BHT" manufactured by Sumitomo Chemical Co.) as an antioxidant were mixed, and the mixture was sufficiently melt-kneaded with a mixing roll and press-molded with a press-molding machine at 150° C. for 30 minutes to produce a resin layer A-3 having an average thickness of 0.15 mm.

(2) Production of Interlayer for Laminated Glass and Laminated Glass

An interlayer for laminated glass and a laminated glass were produced in the same manner as described in Example 4-1 except that the resin layer A-1 was replaced with the resin layer A-3.

Example 4-6

(1) Production of Resin Layer B-4

A quantity of 100 parts by weight of the resin (b) obtained in Example 4-1, 40 parts by weight of triethylene glycol di-2-ethylbutyrate (3GH) as a plasticizer, 3 parts by weight of fine ITO particles (manufactured by Mitsubishi Materials Co.) as heat-ray shielding fine particles, 0.1 part by weight of 2-(2'-hydroxy-5'-methylphenyl)benzotriazole ("TINUVIN P" manufactured by CIBA-GEIGY Co.) as a UV absorber, 0.1 part by weight of t-butyl hydroxytoluene ("Sumilizer BHT" manufactured by Sumitomo Chemical Co.) as an antioxidant, and 4.0 parts by weight of silica having an average particle size of 5 μm as inorganic fine particles were mixed, and the mixture was sufficiently melt-kneaded with a mixing roll and press-molded at 150° C. for 30 minutes with a press-molding machine to produce a resin layer B-4 having an average thickness of 0.20 mm.

(2) Production of Interlayer for Laminated Glass and Laminated Glass

An interlayer for laminated glass and a laminated glass were produced in the same manner as described in Example 4-1 except that the resin layer B-1 was replaced with the resin layer B-4.

Example 4-7

The interlayer for laminated glass and laminated glass were produced in the same manner as described in Example 4-2 except that the resin layer A-1 was replaced with the resin layer A-3 produced in Example 4-5.

Example 4-8

(1) Production of Resin Layer B-5

A quantity of 100 parts by weight of the above-described resin (b), 43 parts by weight of triethylene glycol di-2-ethylbutyrate (3GH) as a plasticizer, 4 parts by weight of fine ITO particles (manufactured by Mitsubishi Materials Co.) as heat-ray shielding fine particles, 0.1 part by weight of 2-(2'-hydroxy-5'-methylphenyl)benzotriazole ("TINUVIN P" manufactured by CIBA-GEIGY Co.) as a UV absorber, 0.1 part by weight of t-butyl hydroxytoluene ("Sumilizer BHT" manufactured by Sumitomo Chemical Co.) as an antioxidant, and 7.5 parts by weight of calcium carbonate having an average particle size of 3 μm as inorganic fine particles were mixed, and the mixture was sufficiently melt-kneaded with a mixing roll and press-molded with a press-molding machine at 150° C. for 30 minutes to produce a resin layer B-5 having an average thickness of 0.30 mm.

(2) Production of Interlayer for Laminated Glass and Laminated Glass

An interlayer for laminated glass and a laminated glass were produced in the same manner as described in Example 4-2 except that the resin layer B-2 was replaced with the resin layer B-5.

Example 4-9

An interlayer for laminated glass and a laminated glass were produced in the same manner as described in Example 4-3 except that the resin layer A-1 was replaced with the resin layer A-3 produced in Example 4-5.

Example 4-10

(1) Production of Resin Layer B-6

A quantity of 100 parts by weight of the resin (b) obtained in Example 4-1, 35 parts by weight of triethylene glycol di-2-ethylbutyrate (3GH) as a plasticizer, 3.5 parts by weight of fine ITO particles (manufactured by Mitsubishi Materials Co.) as heat-ray shielding fine particles, 0.1 part by weight of 2-(2'-hydroxy-5'-methylphenyl)-benzotriazole ("TINUVIN P" manufactured by CIBA-GEIGY Co.) as a UV absorber, 0.1 part by weight of t-butyl hydroxytoluene ("Sumilizer BHT" manufactured by Sumitomo Chemical Co.) as an antioxidant, and 5.0 parts by weight of a dark red-brown pigment obtained by mixing equal amounts of four pigments, namely carbon black, C.I.Pigment red 207, C.I.Pigment blue 151 and C.I.Pigment yellow 110, as inorganic fine particles, were mixed, and the mixture was sufficiently melt-kneaded with a mixing roll and press-molded at 150° C. for 30 minutes with a press-molding machine to produce a resin layer B-6 having an average thickness of 0.30 mm.

(2) Production of Interlayer for Laminated Glass and Laminated Glass

An interlayer for laminated glass and a laminated glass were produced in the same manner as described in Example 4-3 except that the resin layer B-3 was replaced with the resin layer B-6.

Example 4-11

(1) Production of Resin Layer A-4

A quantity of 100 parts by weight of the resin (a) as produced in Example 4-1, 60 parts by weight of triethylene glycol di-2-ethylbutyrate (3GH) as a plasticizer, 3 parts by weight of fine ITO particles (manufactured by Mitsubishi Materials) as heat-ray shielding fine particles, 0.1 part by weight of 2-(2'-hydroxy-5'-methylphenyl)-benzotriazole ("TINUVIN P" manufactured by CIBA-GEIGY Co.) as a UV absorber, 0.1 part by weight of t-butyl hydroxytoluene ("Sumilizer BHT" manufactured by Sumitomo Chemical Co.) as an antioxidant, and 8.3 parts by weight of calcium carbonate particles having an average particle size of 3 μm as inorganic fine particles were mixed, and the mixture was sufficiently melt-kneaded with a mixing roll press-molded with a press-molding machine at 150° C. for 30 minutes to produce an opaque and sound-insulating resin layer A-4 having an average thickness of 0.15 mm.

(2) Production of Interlayer for Laminated Glass and Laminated Glass

An interlayer for laminated glass and a laminated glass were produced in the same manner as described in Example 4-4 except that the resin layer A-2 was replaced with the resin layer A-4.

Example 4-12

(1) Production of Resin Layer B-7

A quantity of 100 parts by weight of the resin (b) obtained in Example 4-1, 40 parts by weight of triethylene glycol di-2-ethylbutyrate (3GH) as a plasticizer, 2 parts by weight of fine ITO particles (manufactured by Mitsubishi Materials Co.) as heat-ray shielding fine particles, 0.1 part by weight of 2-(2'-hydroxy-5'-methylphenyl)benzotriazole ("TINUVIN P" manufactured by CIBA-GEIGY Co.) as a UV absorber, 0.1 part by weight of t-butyl hydroxytoluene ("Sumilizer BHT" manufactured by Sumitomo Chemical Co.) as an antioxidant, and 7.5 parts by weight of calcium carbonate having an average particle size of 3 μm as inorganic fine particles were mixed, and the mixture was sufficiently melt-kneaded with a mixing roll, press-molded with a press-molding machine at 150° C. for 30 minutes to produce a resin layer B-7 having an average thickness of 0.30 mm.

(2) Production of Interlayer for Laminated Glass and Laminated Glass

An interlayer for laminated glass and a laminated glass were produced in the same manner as described in Example 4-7 except that the resin layer B-2 was replaced with the resin layer B-7.

(Evaluation)

For the laminated glass sheets produced individually in Examples 4-1 to 4-4 and Comparative Example 4-1, a haze value and a loss factor were measured using the following methods. The evaluation results are shown in Table 6.

For each of the laminated glass sheets produced in Examples 4-5 to 4-12, a haze value, a loss factor, a visible light transmittance (Tv), a solar transmittance (Te), and a solar reflectance (Re) were measured using the following methods. The evaluation results of Examples 4-5 to 4-8 and Examples 4-9 to 4-12 are shown in Tables 7 and 8, respectively.

(1) Measurement of Haze Value

A haze value in the rays of light at the wavelengths of 340 to 1800 nm was measured with an integrating turbidimeter (manufactured by Tokyo Denshoku Co.) in accordance with JIS K 6714 "Methacryl Resin Plate for Aircraft".

(2) Measurement of Loss Factor

A sample (25 mm wide×300 mm long) was cut from the laminated glass, and subjected to vibration by the use of a vibration generator for damping tests ("G21-005D" manufactured by Shinken Co.) in a thermostat-controlled bath at 20° C. The resulting vibration characteristics were amplified by a mechanical impedance amplifier ("XG-81" manufactured by RION Co.) and the vibration spectra were analyzed by an FFT spectrum analyzer ("FFT Spectrum Analyzer HP 3582A" manufactured by Yokogawa Hewlett Packard Co.) to determine a loss factor from the peak in the frequency range from 2,000 to 3,000 Hz. A higher loss factor means a higher level of sound-insulating property.

In the above-mentioned measurements, the laminated glass was illuminated from the above with a 114 W incandescent lamp for 30 minutes, whereby the loss factors were measured before and after illumination with the incandescent lamp to determine whether or not the laminated glass underwent a change in sound-insulating property due to light illumination and also the degree of such change.

(3) Measurement of Visible Light Transmittance (Tv), Solar Transmittance (Te), and Solar Reflectance (Re)

A visible light transmittance (Tv) at the wavelengths of 380 to 780 nm, a solar transmittance (Te) at the wavelengths of 300 to 2100 nm, and a solar reflectance (Re) at the wavelengths of 300 to 2100 nm were measured with a direct-recording spectrophotometer ("UV-3100" manufactured by Shimadzu Corp.) in accordance with JIS Z 8722 and JIS R 3106.

TABLE 6

| | | Example 4-1 | Example 4-2 | Example 4-3 | Example 4-4 | Comparative Example 4-1 |
|---|---|---|---|---|---|---|
| Sound-insulating resin layer A | Resin (a) | A-1 | A-1 | A-1 | A-2 | A-1 |
| | | 100 | 100 | 100 | 100 | 100 |
| | 3GH | 55 | 55 | 55 | 55 | 55 |
| | Tinuvin P | 0.1 | 0.1 | 0.1 | 0.1 | 0.1 |
| | BHT | 0.1 | 0.1 | 0.1 | 0.1 | 0.1 |
| | Calcium carbonate | — | — | — | 8.3 | — |
| | Thickness (mm) | 0.15 | 0.15 | 0.15 | 0.15 | 0.15 |
| Opaque resin layer B | Resin (b) | B-1 | B-2 | B-3 | B-2 | — |
| | | 100 | 100 | 100 | 100 | — |
| | 3GH | 35 | 40 | 40 | 40 | — |
| | Tinuvin P | 0.1 | 0.1 | 0.1 | 0.1 | — |
| | BHT | 0.1 | 0.1 | 0.1 | 0.1 | — |
| | Silica | 4 | — | — | — | — |
| | Calcium carbonate | — | 7.5 | — | 7.5 | — |
| | Mixed pigment | — | — | 5 | — | — |
| | Thickness (mm) | 0.2 | 0.3 | 0.15 | 0.3 | — |
| Transparent resin layer C | Resin (b) | 100 | — | 100 | — | 100 |
| | 3GH | 40 | — | 40 | — | 40 |
| | Tinuvin P | 0.1 | — | 0.1 | — | 0.1 |
| | BHT | 0.1 | — | 0.1 | — | 0.1 |
| | Thickness (mm) | 0.3 | — | 0.3 | — | 0.3 |
| Laminate construction | | B/A/C | B/A/B | B/C/A/C | B/A/B | C/A/C |
| Thickness of interlayer (mm) | | 0.65 | 0.65 | 0.75 | 0.75 | 0.75 |
| Haze value of laminated glass (%) | | 55 | 91 | 83 | 92 | 0.5 |

TABLE 6-continued

|  |  | Example 4-1 | Example 4-2 | Example 4-3 | Example 4-4 | Comparative Example 4-1 |
|---|---|---|---|---|---|---|
| Loss factor | Before illumination with incandescent light | 0.36 | 0.37 | 0.38 | 0.41 | 0.37 |
|  | After illumination with incandescent light | 0.28 | 0.36 | 0.33 | 0.38 | 0.17 |

TABLE 7

|  |  | Example 4-5 | Example 4-6 | Example 4-7 | Example 4-8 |
|---|---|---|---|---|---|
| Sound-insulating resin layer A | | A-3 | A-1 | A-3 | A-1 |
| | Resin (a) | 100 | 100 | 100 | 100 |
| | 3GH | 60 | 55 | 60 | 55 |
| | Fine ITO particles | 2.5 | — | 2.5 | — |
| | Tinuvin P | 0.1 | 0.1 | 0.1 | 0.1 |
| | BHT | 0.1 | 0.1 | 0.1 | 0.1 |
| | Calcium carbonate | — | — | — | — |
| | Thickness (mm) | 0.15 | 0.15 | 0.15 | 0.15 |
| Opaque resin layer B | | B-1 | B-4 | B-2 | B-5 |
| | Resin (b) | 100 | 100 | 100 | 100 |
| | 3GH | 35 | 40 | 40 | 43 |
| | Fine ITO particles | — | 3 | — | 4 |
| | Tinuvin P | 0.1 | 0.1 | 0.1 | 0.1 |
| | BHT | 0.1 | 0.1 | 0.1 | 0.1 |
| | Silica | 4 | 4 | — | — |
| | Calcium carbonate | — | — | 7.5 | 7.5 |
| | Mixed pigment | — | — | — | — |
| | Thickness (mm) | 0.2 | 0.2 | 0.3 | 0.3 |
| Transparent resin layer C | Resin (b) | 100 | 100 | — | — |
| | 3GH | 40 | 40 | — | — |
| | Fine ITO particles | — | — | — | — |
| | Tinuvin P | 0.1 | 0.1 | — | — |
| | BHT | 0.1 | 0.1 | — | — |
| | Thickness (mm) | 0.3 | 0.3 | — | — |
| Laminate construction | | B/A/C | B/A/C | B/A/B | B/A/B |
| Thickness of interlayer (mm) | | 0.65 | 0.65 | 0.75 | 0.75 |
| Haze value of laminated glass (%) | | 56 | 55 | 90 | 90 |
| Loss factor | Before illumination with incandescent lamp | 0.37 | 0.37 | 0.39 | 0.38 |
| | After illumination with incandescent lamp | 0.29 | 0.31 | 0.30 | 0.32 |
| Visible light transmittance (Tv) | | 70 | 69 | 59 | 59 |
| Solar transmittance (Te) | | 61 | 58 | 49 | 43 |
| Solar reflectance (Re) | | 8 | 9 | 10 | 11 |

TABLE 8

|  |  | Example 4-9 | Example 4-10 | Example 4-11 | Example 4-12 |
|---|---|---|---|---|---|
| Sound-insulating resin layer A | | A-3 | A-1 | A-4 | A-3 |
| | Resin (a) | 100 | 100 | 100 | 100 |
| | 3GH | 60 | 55 | 60 | 60 |
| | Fine ITO particles | 2.5 | — | 3 | 2.5 |
| | Tinuvin P | 0.1 | 0.1 | 0.1 | 0.1 |
| | BHT | 0.1 | 0.1 | 0.1 | 0.1 |
| | Calcium carbonate | — | — | 8.3 | — |
| | Thickness (mm) | 0.15 | 0.15 | 0.15 | 0.15 |
| Opaque resin layer B | | B-3 | B-6 | B-2 | B-7 |
| | Resin (b) | 100 | 100 | 100 | 100 |
| | 3GH | 40 | 35 | 40 | 40 |
| | Fine ITO particles | — | 3.5 | — | 2 |
| | Tinuvin P | 0.1 | 0.1 | 0.1 | 0.1 |
| | BHT | 0.1 | 0.1 | 0.1 | 0.1 |
| | Silica | — | — | — | — |
| | Calcium carbonate | — | — | 7.5 | 7.5 |
| | Mixed pigment | 5 | 5 | — | — |
| | Thickness (mm) | 0.2 | 0.2 | 0.3 | 0.3 |
| Transparent resin layer C | Resin (b) | 100 | 100 | — | — |
| | 3GH | 40 | 40 | — | — |
| | Fine ITO particles | — | — | — | — |
| | Tinuvin P | 0.1 | 0.1 | — | — |
| | BHT | 0.1 | 0.1 | — | — |
| | Thickness (mm) | 0.3 | 0.3 | — | — |
| Laminate construction | | B/C/A/C | B/C/A/C | B/A/B | B/A/B |
| Thickness of interlayer (mm) | | 0.95 | 0.95 | 0.75 | 0.75 |
| Haze value of laminated glass (%) | | 84 | 82 | 93 | 89 |
| Loss factor | Before illumination with incandescent lamp | 0.38 | 0.37 | 0.40 | 0.41 |
| | After illumination with incandescent lamp | 0.30 | 0.32 | 0.37 | 0.36 |
| Visible light transmittance (Tv) | | 65 | 66 | 53 | 58 |
| Solar transmittance (Te) | | 55 | 53 | 42 | 44 |
| Solar reflectance (Re) | | 6 | 5 | 10 | 11 |

INDUSTRIAL APPLICABILITY

The laminated glass obtained by using the interlayer for laminated glass of the present invention is suitably used in the application fields where light shielding property is particularly required, among roof and side window panes of automobiles except windshields as well as windows of buildings, and the like.

The invention claimed is:

1. An interlayer for laminated glass, which comprises at least two kinds of layers of (A) an opaque and sound-insulating polyvinyl acetal resin layer containing fine-particle inorganic powder and 55 parts by weight or more of a plasticizer per 100 parts by weight of a polyvinyl acetal resin, and (B) a transparent polyvinyl acetal resin layer, the layers being laminated together,
wherein the plasticizer is selected from the group consisting of triethylene glycol di-2-ethylbutyrate, triethylene glycol-di-2-ethylhexanoate, triethylene glycol-di-n-heptanoate, tetraethylene glycol-di-2-ethylhexanoate, tetraethylene glycol-di-n-heptanoate and oligoethylene glycol-di-2-ethylhexanoate,
wherein the polyvinyl acetal resin is a polyvinyl butyral resin,
wherein the resin of the (A) layer has a vinyl acetate content (residual acetyl groups) of 8 to 30 mol %,
wherein the fine particle inorganic powder is selected from the group consisting of calcium carbonate and silica,
wherein (B) the transparent polyvinyl acetal resin layer comprises a polyvinyl acetal resin (b) with a vinyl acetate content (residual acetyl groups) of not more than 14 mol % produced by acetalization of a polyvinyl alcohol with an aldehyde having 3 to 4 carbon atoms, and a plasticizer,
wherein the amount of the plasticizer in (A) the opaque and sound-insulating polyvinyl acetal resin layer is larger than the amount of the plasticizer in (B) the transparent polyvinyl acetal resin layer, and
wherein (A) the opaque and sound-insulating polyvinyl acetal resin layer has a different viscoelastic property than (B) the transparent polyvinyl acetal resin layer.

2. The interlayer for laminated glass according to claim 1, wherein at least one of (A) the opaque and sound-insulating polyvinyl acetal resin layer and (B) the transparent polyvinyl acetal resin layer contains heat-ray shielding fine particles.

3. A laminated glass comprising at least two transparent glass sheets, wherein the interlayer for laminated glass according to any one of claim 1 or 2 is bonded between at least two glass sheets.

4. The laminated glass according to claim 3, wherein the laminated glass has a haze value of not less than 20%.

5. An interlayer for laminated glass, which comprises at least two kinds of layers of (A) an opaque and sound-insulating polyvinyl acetal resin layer containing fine-particle inorganic powder and 55 parts by weight or more of a plasticizer per 100 parts by weight of a polyvinyl acetal resin, and (B) a transparent polyvinyl acetal resin layer, the layers being laminated together,
wherein the plasticizer is selected from the group consisting of triethylene glycol di-2-ethylbutyrate, triethylene glycol-di-2-ethylhexanoate, triethylene glycol-di-n-heptanoate, tetraethylene glycol-di-2-ethylhexanoate, tetraethylene glycol-di-n-heptanoate and oligoethylene glycol-di-2-ethylhexanoate,
wherein the polyvinyl acetal resin is a polyvinyl butyral resin,
wherein the resin of the (A) layer has a vinyl acetate content (residual acetyl groups) of 8 to 30 mol %,
wherein the fine-particle inorganic powder is calcium carbonate or silica,
wherein (B) the transparent polyvinyl acetal resin layer comprises a polyvinyl butyral resin (b) with a vinyl acetate content (residual acetyl groups) of not more than 14 mol %, and a plasticizer,
wherein the amount of the plasticizer in (A) the opaque and sound-insulating polyvinyl acetal resin layer is larger than the amount of the plasticizer in (B) the transparent polyvinyl acetal resin layer, and
wherein (A) the opaque and sound-insulating polyvinyl acetal resin layer has a different viscoelastic property than (B) the transparent polyvinyl acetal resin layer.

* * * * *